(12) United States Patent
Uddi et al.

(10) Patent No.: US 11,845,660 B2
(45) Date of Patent: Dec. 19, 2023

(54) METHOD OF CHEMICAL LOOPING REFORMING AT LOW TEMPERATURES WITH HYDROGEN FROM WATER SPLITTING

(71) Applicant: The Board of Trustees of The University of Alabama, Tuscaloosa, AL (US)

(72) Inventors: Mruthunjaya Uddi, Tuscaloosa, AL (US); Rajagopalan Varadarajan Ranganathan, Tuscaloosa, AL (US); Steven M. Fondriest, Granville, OH (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 893 days.

(21) Appl. No.: 16/707,607

(22) Filed: Dec. 9, 2019

(65) Prior Publication Data

US 2020/0255290 A1 Aug. 13, 2020

Related U.S. Application Data

(60) Provisional application No. 62/802,757, filed on Feb. 8, 2019.

(51) Int. Cl.
*C01B 3/40* (2006.01)
*B01J 23/00* (2006.01)
(Continued)

(52) U.S. Cl.
CPC ............... *C01B 3/40* (2013.01); *B01J 23/002* (2013.01); *B01J 23/10* (2013.01); *B01J 35/1014* (2013.01); *B01J 35/1066* (2013.01); *B01J 37/04* (2013.01); *B01J 37/08* (2013.01);
*C01B 3/061* (2013.01); *C01B 2203/0244* (2013.01); *C01B 2203/0861* (2013.01); *C01B 2203/1058* (2013.01); *C01B 2203/1252* (2013.01);
(Continued)

(58) Field of Classification Search
CPC ................................ C01B 3/40; B01J 23/002
USPC .......................................................... 423/657
See application file for complete search history.

(56) References Cited

FOREIGN PATENT DOCUMENTS

WO WO2018222749 * 12/2018

OTHER PUBLICATIONS

Catalyst assisted by non-thermal plasma in dry reforming of methane at low temperature. David Yap et al. Catalysis Today, V 299, pp. 263-271 (Year: 2017).*

(Continued)

*Primary Examiner* — Douglas B Call
(74) *Attorney, Agent, or Firm* — Meunier Carlin & Curfman LLC

(57) ABSTRACT

Chemical looping reform methods comprising heating an oxygen carrier in the presence of a catalyst and plasma radicals to react the oxygen carrier with a fuel to provide a reduced oxygen carrier; and contacting the reduced oxygen carrier with water or carbon dioxide to produce hydrogen or carbon monoxide, respectively, and regenerate the oxygen carrier. The chemical looping reform methods are carried out at low temperatures such as from 150° C. to 1000° C., preferably from 150° C. to 500° C. Catalyst used in the chemical looping reform methods include a sintered rare earth metal oxide oxygen carrier and perovskite. Methods of preparing the catalyst are also provided.

11 Claims, 12 Drawing Sheets

(51) Int. Cl.
  B01J 23/10   (2006.01)
  B01J 35/10   (2006.01)
  B01J 37/08   (2006.01)
  B01J 37/04   (2006.01)
  C01B 3/06    (2006.01)

(52) U.S. Cl.
  CPC ............... C01B 2203/1264 (2013.01); C01B 2203/148 (2013.01); C01B 2203/1614 (2013.01)

(56) References Cited

OTHER PUBLICATIONS

Designed oxygen carriers from macroporous LaFeO3 supported CeO2 for chemical-looping reforming of methane. Yane Zheng et al. Applied Catalysis B: Environmental, v 202, pp. 51-63 (Year: 2016).*
Abad, Alberto, et al. "Chemical-looping combustion in a 300 W continuously operating reactor system using a manganese-based oxygen carrier." Fuel 85.9 (2006): 1174-1185.
Abdullah, Bawadi, Nur Azeanni Abd Ghani, and Dai-Viet N. Vo. "Recent advances in dry reforming of methane over Ni-based catalysts." Journal of Cleaner Production 162 (2017): 170-185.
Adánez, Juan, et al. "Chemical looping combustion in a 10 kWth prototype using a CuO/Al2O3 oxygen carrier: Effect of operating conditions on methane combustion." Industrial & Engineering Chemistry Research 45.17 (2006): 6075-6080.
Adanez, Juan, et al. "Progress in chemical-looping combustion and reforming technologies." Progress in energy and combustion science 38.2 (2012): 215-282.
Adánez, Juan, et al. "Selection of oxygen carriers for chemical-looping combustion." Energy & Fuels 18.2 (2004): 371-377.
Berguerand, Nicolas, and Anders Lyngfelt. "Chemical-looping combustion of petroleum coke using ilmenite in a 10 kWth unit—high-temperature operation." Energy & Fuels 23.10 (2009): 5257-5268.
Chen, Jixiang, et al. "Synthesis gas production from dry reforming of methane over Ce0.75Zr0.2502-supported Ru catalysts." International journal of hydrogen energy 35.4 (2010): 1630-1642.
Chen, Tianjiao. Experimental characterization and chemical kinetics study of chemical looping combustion. Diss. Massachusetts Institute of Technology, 2014.
Cho, Paul, Tobias Mattisson, and Anders Lyngfelt. "Comparison of iron-, nickel-, copper-and manganese-based oxygen carriers for chemical-looping combustion." Fuel 83.9 (2004): 1215-1225.
Chuang, S. Y., et al. "Development and performance of Cu-based oxygen carriers for chemical-looping combustion." Combustion and Flame 154.1-2 (2008): 109-121.
Chueh, William C., et al. "High-flux solar-driven thermochemical dissociation of CO2 and H2O using nonstoichiometric ceria." Science 330.6012 (2010): 1797-1801.
Corbella, Beatriz M., et al. "The performance in a fixed bed reactor of copper-based oxides on titania as oxygen carriers for chemical looping combustion of methane." Energy & Fuels 19.2 (2005): 433-441.
Dahl, Ivar M., et al. "On the development of novel reactor concepts for chemical looping combustion." Energy Procedia 1.1 (2009): 1513-1519.
Dave, B. C.; Lockwood, S. B., Sol-Gel Method. In Encyclopedia of Nanotechnology, Bhushan, B., Ed. Springer Netherlands: Dordrecht, 2012; pp. 2459-2470.
De Diego, Luis F., et al. "Development of Cu-based oxygen carriers for chemical-looping combustion." Fuel 83.13 (2004): 1749-1757.
Furler, Philipp, et al. "Solar thermochemical CO2 splitting utilizing a reticulated porous ceria redox system." Energy & Fuels 26.11 (2012): 7051-7059.
Gallego, Germán Sierra, et al. "Influence of Pr and Ce in dry methane reforming catalysts produced from La1-xAxNiO3-δ perovskites." Applied Catalysis A: General 369.1-2 (2009): 97-103.

Garcia-Labiano, Francisco, et al. "Effect of pressure on the behavior of copper-, iron-, and nickel-based oxygen carriers for chemical-looping combustion." Energy & Fuels 20.1 (2006): 26-33.
Gayán, Pilar, et al. "Development of Cu-based oxygen carriers for Chemical-Looping with Oxygen Uncoupling (CLOU) process." Fuel 96 (2012): 226-238.
Gayán, Pilar, et al. "Effect of support on reactivity and selectivity of Ni-based oxygen carriers for chemical-looping combustion." Fuel 87.12 (2008): 2641-2650.
Gu, Haiming, et al. "Chemical looping combustion of biomass/coal with natural iron ore as oxygen carrier in a continuous reactor." Energy & fuels 25.1 (2011): 446-455.
Håkonsen, Silje Fosse, and Richard Blom. "Chemical looping combustion in a rotating bed reactor-finding optimal process conditions for prototype reactor." Environmental science & technology 45.22 (2011): 9619-9626.
Hayakawa, Takashi, et al. "CO2 reforming of CH4 over Ni/perovskite catalysts prepared by solid phase crystallization method." Applied Catalysis A: General 183.2 (1999): 273-285.
Holub, Marcin. "On the measurement of plasma power in atmospheric pressure DBD plasma reactors." International Journal of Applied Electromagnetics and Mechanics 39.1-4 (2012): 81-87.
Huang, Lihong, et al. "Nickel-based perovskite catalysts with iron-doping via self-combustion for hydrogen production in autothermal reforming of Ethanol." International journal of hydrogen energy 37.2 (2012): 1272-1279.
International energy agency statistics: 2015. 81 pages.
Janev, R. K., and D. Reiter. "Collision processes of CH y and CH y+ hydrocarbons with plasma electrons and protons." Physics of Plasmas 9.9 (2002): 4071-4081.
Johansson, Marcus, et al. "Using continuous and pulse experiments to compare two promising nickel-based oxygen carriers for use in chemical-looping technologies." Fuel 87.6 (2008): 988-1001.
Johansson, Marcus, Tobias Mattisson, and Anders Lyngfelt. "Investigation of Fe2O3 with MgAl2O4 for chemical-looping combustion." Industrial & Engineering Chemistry Research 43.22 (2004): 6978-6987.
Johansson, Marcus, Tobias Mattisson, and Anders Lyngfelt. "Investigation of Mn3O4 with stabilized ZrO2 for chemical-looping combustion." Chemical Engineering Research and Design 84.9 (2006): 807-818.
Ju, Yiguang, et al. "Plasma assisted low temperature combustion." Plasma Chemistry and Plasma Processing 36.1 (2016): 85-105.
Kaneko, Hiroshi, et al. "Rotary-type solar reactor for solar hydrogen production with two-step water splitting process." Energy & Fuels 21.4 (2007): 2287-2293.
Kim, Hyun-Ha, Atsushi Ogata, and Shigeru Futamura. "Oxygen partial pressure-dependent behavior of various catalysts for the total oxidation of VOCs using cycled system of adsorption and oxygen plasma." Applied Catalysis B: Environmental 79.4 (2008): 356-367.
Kim, Hyun-Ha, et al. "Plasma catalysis for environmental treatment and energy applications." Plasma Chemistry and Plasma Processing 36.1 (2016): 45-72.
Kim, Hyun-Ha. "Nonthermal plasma processing for air-pollution control: a historical review, current issues, and future prospects." Plasma Processes and Polymers 1.2 (2004): 91-110.
Kim, Taegyu, et al. "Synergetic mechanism of methanol-steam reforming reaction in a catalytic reactor with electric discharges." Applied energy 113 (2014): 1692-1699.
Kodama, Tatsuya. "High-temperature solar chemistry for converting solar heat to chemical fuels." Progress in energy and combustion science 29.6 (2003): 567-597.
Kvamsdal, Hanne M., Kristin Jordal, and Olav Bolland. "A quantitative comparison of gas turbine cycles with CO2 capture." Energy 32.1 (2007): 10-24.
Li, Fanxing, et al. "Syngas chemical looping gasification process: Bench-scale studies and reactor simulations." AIChE journal 56.8 (2010): 2186-2199.
Li, Fanxing, Liang Zeng, and Liang-Shih Fan. "Biomass direct chemical looping process: process simulation." Fuel 89.12 (2010): 3773-3784.
Li, Junhao, Zhongqi Liu, and Ruigang Wang. "Support structure and reduction treatment effects on CO oxidation of SiO2 nanospheres

(56) References Cited

OTHER PUBLICATIONS and CeO2 nanorods supported ruthenium catalysts." Journal of colloid and interface science 531 (2018): 204-215.

Linderholm, Carl, Tobias Mattisson, and Anders Lyngfelt. "Long-term integrity testing of spray-dried particles in a 10-kW chemical-looping combustor using natural gas as fuel." Fuel 88.11 (2009): 2083-2096.

Mahendraprabhu, Kamaraj, and Perumal Elumalai. "Influence of citric acid on formation of Ni/NiO nanocomposite by sol-gel synthesis." Journal of Sol-Gel Science and Technology 73.2 (2015): 428-433.

Mattisson, Tobias, Anders Järdnäs, and Anders Lyngfelt. "Reactivity of some metal oxides supported on alumina with alternating methane and oxygen application for chemical-looping combustion." Energy & Fuels 17.3 (2003): 643-651.

Mattisson, Tobias, Marcus Johansson, and Anders Lyngfelt. "Multicycle reduction and oxidation of different types of iron oxide particles application to chemical-looping combustion." Energy & Fuels 18.3 (2004): 628-637.

Mattisson, Tobias, Marcus Johansson, and Anders Lyngfelt. "The use of NiO as an oxygen carrier in chemical-looping combustion." Fuel 85.5-6 (2006): 736-747.

Mehta, Prateek, et al. "Overcoming ammonia synthesis scaling relations with plasma-enabled catalysis." Nature Catalysis 1.4 (2018): 269-275.

Neises, Martina, et al. "Kinetic investigations of the hydrogen production step of a thermochemical cycle using mixed iron oxides coated on ceramic substrates." International journal of energy research 34.8 (2010): 651-661.

Neyts, E. C., and A. Bogaerts. "Understanding plasma catalysis through modelling and simulation—a review." Journal of Physics D: Applied Physics 47.22 (2014): 224010.

Noorman, S., et al. "Experimental investigation of chemical-looping combustion in packed beds: a parametric study." Industrial & engineering chemistry research 50.4 (2011): 1968-1980.

Noorman, S., M. van Sint Annaland, and J. A. M. Kuipers. "Experimental validation of packed bed chemical-looping combustion." Chemical Engineering Science 65.1 (2010): 92-97.

Noorman, Sander, Martin van Sint Annaland, and Hans Kuipers. "Packed bed reactor technology for chemical-looping combustion." Industrial & Engineering Chemistry Research 46.12 (2007): 4212-4220.

Pröll, Tobias, et al. "A novel dual circulating fluidized bed system for chemical looping processes." AIChE journal 55.12 (2009): 3255-3266.

Roeb, Martin, et al. "Materials-related aspects of thermochemical water and carbon dioxide splitting: a review." Materials 5.11 (2012): 2015-2054.

Roeb, Martin, et al. "Test operation of a 100 kW pilot plant for solar hydrogen production from water on a solar tower." Solar Energy 85.4 (2011): 634-644.

Rydén, Magnus, et al. "Fe2O3 on Ce-, Ca-, or Mg-stabilized ZrO2 as oxygen carrier for chemical-looping combustion using NiO as additive." AIChE journal 56.8 (2010): 2211-2220.

Sadykov, V. A., et al. "Dry reforming of methane over Pt/PrCeZrO catalyst: Kinetic and mechanistic features by transient studies and their modeling." Catalysis today 171.1 (2011): 140-149.

Shen, Laihong, et al. "Chemical-looping combustion of biomass in a 10 kWth reactor with iron oxide as an oxygen carrier." Energy & Fuels 23.5 (2009): 2498-2505.

Stagg-Williams, Susan M., et al. "CO2 reforming of CH4 over Pt/ZrO2 catalysts promoted with La and Ce oxides." Journal of Catalysis 194.2 (2000): 240-249.

Steinfeld, Aldo. "Solar thermochemical production of hydrogen—a review." Solar energy 78.5 (2005): 603-615.

Sugiura, Kei, et al. "Low-temperature catalytic oxidative coupling of methane in an electric field over a Ce—W—O catalyst system." Scientific reports 6 (2016): 25154.

Uddi, Mruthunjaya, et al. "Atomic oxygen measurements in air and air/fuel nanosecond pulse discharges by two photon laser induced fluorescence." Proceedings of the Combustion Institute 32.1 (2009): 929-936.

Wang, Ruigang, Peter A. Crozier, and Renu Sharma. "Structural transformation in ceria nanoparticles during redox processes." The Journal of Physical Chemistry C 113.14 (2009): 5700-5704.

Whang, Ho Seok, et al. "Enhanced activity and durability of Ru catalyst dispersed on zirconia for dry reforming of methane." Catalysis Today 293 (2017): 122-128.

Whitehead, J. Christopher. "Plasma catalysis: A solution for environmental problems." Pure and Applied Chemistry 82.6 (2010): 1329-1336.

Whitehead, J. Christopher. "Plasma-catalysis: the known knowns, the known unknowns and the unknown unknowns." Journal of Physics D: Applied Physics 49.24 (2016): 243001.

Wu, Xiao-Yu, et al. "Toward enhanced hydrogen generation from water using oxygen permeating LCF membranes." Physical Chemistry Chemical Physics 17.15 (2015): 10093-10107.

Yabe, Tomohiro, et al. "Low-temperature dry reforming of methane to produce syngas in an electric field over La-doped Ni/ZrO2 catalysts." Fuel Processing Technology 158 (2017): 96-103.

Zhao, Zhenlong, and Ahmed F. Ghoniem. "Design of a rotary reactor for chemical-looping combustion. Part 2: Comparison of copper-, nickel-, and iron-based oxygen carriers." Fuel 121 (2014): 344-360.

Zhao, Zhenlong, et al. "Design of a rotary reactor for chemical-looping combustion. Part 1: Fundamentals and design methodology." Fuel 121 (2014): 327-343.

Zhao, Zhenlong, et al. "Enhanced intermediate-temperature CO 2 splitting using nonstoichiometric ceria and ceria-zirconia." Physical Chemistry Chemical Physics 19.37 (2017): 25774-25785.

Zhao, Zhenlong, et al. "Redox kinetics and nonstoichiometry of Ce0. 5Zr0. 5O2-δ for water splitting and hydrogen production." The Journal of Physical Chemistry C 121.21 (2017): 11055-11068.

Zhao, Zhenlong, et al. "Redox kinetics study of fuel reduced ceria for chemical-looping water splitting." The Journal of Physical Chemistry C 120.30 (2016): 16271-16289.

Zhao, Zhenlong. Redox kinetics study for chemical-looping combustion, water and CO2 splitting using nickel and cerium-based oxygen carrier. Diss. Massachusetts Institute of Technology, 2016.

Zheng, Yaoyao, et al. "H2 production from partial oxidation of CH4 by Fe2O3-supported Ni-based catalysts in a plasma-assisted packed bed reactor." Proceedings of the Combustion Institute 37.4 (2019): 5481-5488.

\* cited by examiner

METHOD OF CHEMICAL LOOPING REFORMING AT LOW TEMPERATURES WITH HYDROGEN FROM WATER SPLITTING

CROSS-REFERENCE TO RELATED APPLICATIONS

This application claims the benefit of and priority to U.S. Provisional Application Ser. No. 62/802,757 filed on Feb. 8, 2019, the disclosure of which is expressly incorporated herein by reference in its entirety.

STATEMENT REGARDING FEDERALLY SPONSORED RESEARCH

This invention was made with Government Support under Grant No. 01A-1655280 awarded by the National Science Foundation. The Government has certain rights in the invention.

FIELD

The present disclosure generally relates to chemical looping reforming, particularly to chemical looping reforming at low temperatures with water splitting.

BACKGROUND

The continuous rise of carbon dioxide emission and its accumulation in the atmosphere are among the main reasons for global warming. The present atmospheric concentration of carbon dioxide is already approaching 400 ppm. Therefore, extensive research efforts are under way to decrease carbon dioxide emission by various means such as carbon capture sequestration. Chemical looping is a new and promising technology for several applications including oxy-combustion for carbon capture sequestration, hydrogen production and carbon dioxide reuse. One of the primary issues in carbon capture sequestration is the energy penalty involved in separating carbon dioxide from nitrogen containing exhaust in the power plants. Chemical looping addresses this issue by using an oxygen carrier material (metal oxide —$Me_xO_y$ in FIG. 1) through a periodic looping between oxidation and reduction cycle instead of delivering oxygen directly. This makes it easy to separate carbon dioxide for carbon capture sequestration. This way, the energy penalty is lesser than post-combustion separation of carbon dioxide. Chemical looping reforming (CLR) also enables carbon dioxide utilization with methane to produce useful products such as carbon monoxide and hydrogen, as shown in FIG. 1.

Zhao et al. studied chemical looping with redox cycles where fuel was used for reducing the oxygen carrier during the reduction cycle at reactor temperatures in the range 750-1000° C. They found two orders of magnitude higher production of hydrogen (100-300 μmole/g/s) by water splitting compared to thermochemical looping. A review of materials used for isothermal chemical looping can be found in Zhao et al. Other chemical looping reactors used both commercially and on lab test scales have been described in the literature. However, most oxygen carriers have almost no reactivity below 600° C.

There is a need to achieve chemical looping reforming at low temperatures (150-500° C.), which could enable the development of efficient reactors using waste heat, wind energy or solar energy. The compositions and methods disclosed herein address these and other needs.

SUMMARY

In accordance with the purposes of the disclosed compositions, systems, and methods, as embodied and broadly described herein, the disclosed subject matter relates to compositions and methods for use in chemical looping reform methods. The chemical looping reform methods can include heating an oxygen carrier in the presence of a catalyst and plasma radicals to react the oxygen carrier with a fuel to provide a reduced oxygen carrier; and contacting the reduced oxygen carrier with water to produce hydrogen and regenerate the oxygen carrier. The chemical looping reform methods can be carried out at a temperature from 150° C. to 1000° C., preferably from 150° C. to 500° C.

The plasma radicals can include dissociated radicals from the fuel (such as from a hydrocarbon fuel), or radicals from $CO_2$, $H_2O$, other materials present in the reaction mixture, or a combination thereof. Plasma radicals can be generated at an average power of from 1 W to 6 W, preferably from 2 W to 6 W, per 200 mg of the combined catalyst and oxygen carrier. The plasma radicals may be continuously generated during the chemical looping reform method, that is, during the oxidation and reduction cycles. More efficient low power (such as in the mW range per 200 mg combined catalyst and oxygen carrier) surface plasma can be generated using semiconductor fabrication methods.

The catalyst used in the chemical looping reform methods can be selected from a perovskite catalyst, a nano-yolk shell catalyst, a nano-shaped catalyst supported nano-metal particles, a nano-carbide catalyst, a doped graphene based catalyst, zeolite, or a mixture thereof. In some embodiments, the catalyst can include a perovskite catalyst having a formula $A_xB_{1-x}MO_3$, wherein A is a lanthanide, B is a polyvalent cation, M is a transition metal, and x is a number defined by $0.02<x<0.98$. In certain embodiments, the perovskite catalyst can be nickel based, having a formula $A_xB_{1-x}NiO_3$, wherein A is a lanthanide, B is a polyvalent cation, and x is a number defined by $0.02<x<0.98$. In some examples, the perovskite catalyst can have a formula $La_xCe_{1-x}NiO_3$, wherein x is a number defined by $0.02<x<0.98$.

The oxygen carrier used in the chemical looping reform methods can include a metal oxide oxygen carrier. For example, the oxygen carrier can comprise an oxide of a metal selected from the group consisting of cerium, nickel, copper, iron, cobalt, manganese, aluminum, titanium, zirconium, silicon, lanthanum, magnesium, and a mixture thereof. In some examples, the oxygen carrier comprises cerium oxide.

In some aspects, perovskite catalyst and the oxygen carrier can be combined, such as by sintering prior to reacting the oxygen carrier and the fuel. In these embodiments, the perovskite catalyst and the oxygen carrier can be present in a weight ratio of from 1:5 to 5:1, preferably from 1:2 to 2:1. The sintered perovskite catalyst and oxygen carrier can have a BET surface area of 10 $m^2$/g or greater, preferably from 10 $m^2$/g to 20 $m^2$/g and an average particle size of from 50 nm to 100 nm, as determined by SEM images. The sintered perovskite catalyst and oxygen carrier can provide a synergistic catalytic effect in the reaction of the oxygen carrier with the fuel.

The fuel used in the chemical looping reform methods can be a solid, liquid, or gas and in some embodiments, includes a carbonaceous material such as a hydrocarbon. For example, the fuel can comprise an alkane, preferably a $C_1$-$C_{10}$ alkane; an alkene, preferably a $C_2C_{10}$ alkene; a cycloalkane, preferably a $C_3C_{10}$ cycloalkane; a cycloalkene, preferably a $C_3C_{10}$ cycloalkene; an aryl group, preferably a $C_5C_{10}$ aryl group; a syngas; or a mixture thereof.

As described herein, the chemical looping reform methods include water splitting during the oxidation cycle. The water used for hydrogen splitting can be provided in the presence of a gas. The gas is preferably provided in the absence of air. For example, the gas can be selected from argon, nitrogen, or a combination thereof. In some embodiments, the water is provided in the absence of a gas.

The chemical looping reform methods can be performed in a rotary bed reactor, a packed bed reactor, or a ceramic honeycomb. The methods can provide at least 15%, preferably up to 40%, more preferably up to 50% conversion of the hydrocarbon at an input flow rate of 350 sccm and 150° C. In other embodiments, the method can provide at least 40%, preferably up to 70%, more preferably up to 80% conversion of the hydrocarbon at an input flow rate of 350 sccm and 400° C. The flow rates, however, can vary (that is less than or greater than 350 sccm) depending on reactor size.

Methods of preparing catalysts for use in the chemical looping reform methods are also provided. The catalyst can be a perovskite catalyst prepared by dissolving salts of Ni, La, and Ce to form a homogenous solution, drying the solution to form a salt mixture, calcining the salt mixture to form a perovskite having a formula $La_xCe_{1-x}NiO_3$, wherein x is a number defined by $0.02<x<0.98$, blending the perovskite with a metal oxide oxygen carrier to form a blend, and sintering the blend to form the perovskite catalyst. The method can further include adding a complexing agent such as citric acid and/or ethylene glycol to the homogenous solution prior to drying. The salt mixture can be calcined at a temperature from 300° C. to 800° C. The blend of metal oxide oxygen carrier and the perovskite can be sintered from 600° C. to 1000° C., preferably from 600° C. to 800° C.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figure, which is incorporated in and constitutes a part of this specification illustrates aspects described below.

(FIG. 10A) 600-1000° C. (FIG. 10B).

DETAILED DESCRIPTION

Figure 1:
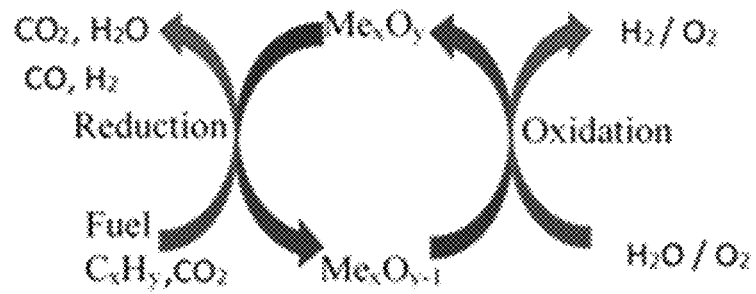
FIG. 1 is a schematic diagram showing a chemical looping reforming (CLR) process.

The materials, compounds, compositions, articles, and methods described herein can be understood more readily by reference to the following detailed description of specific aspects of the disclosed subject matter and the Examples and Figure included therein.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an oxygen carrier" includes mixtures of two or more such oxygen carriers, reference to "the catalyst" includes mixtures of two or more such catalysts, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Chemical Definitions

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt %) of a component, unless specifically stated to the contrary, is based on the total weight of the formulation or composition in which the component is included.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This may be presumed in structural formulae herein wherein an asymmetric alkene is present, or it may be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclo" or "cyclic group" is used herein to refer to either aryl groups, non- aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

"$R^1$," "$R^2$," "$R^3$," "$R^n$," where n is an integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Reference will now be made in detail to specific aspects of the disclosed materials, compounds, compositions, formulations, articles, and methods, examples of which are illustrated in the accompanying Examples and Figure.

Compositions

Provided herein are compositions and methods for chemical looping reform. Chemical looping reform allows decrease of carbon dioxide ($CO_2$) emission by various means such as by carbon capture sequestration (CCS) and/or carbon dioxide reuse as well as for hydrogen ($H_2$) production. Chemical looping reform can be integrated with the splitting of water to form hydrogen and/or of carbon dioxide to form carbon monoxide. For example, in chemical looping reform with water splitting, the reaction cycle generally includes two "redox" steps as shown in FIG. 1—reduction and oxidation. The redox reactions may take place in two separate chambers. Fuel such as a hydrocarbon is oxidized by a metal oxide ($Me_xO_y$) in a fuel reactor to generate for example, CO, $H_2$, $CO_2$, and $H_2O$. During the reduction cycle, water vapor is flown over the reduced metal oxide ($Me_xO_{y-1}$) to re-oxidize it while producing $H_2$.

Fuel

The energy source for the chemical looping reform can be derived from a carbonaceous fuel. The carbonaceous fuel can be derived from coal, methane, biomass, syngas, pet coke, extra heavy oil, wax, oil shale, or a mixture thereof. In some examples, the carbonaceous fuel can include a hydrocarbon. The hydrocarbon can comprise one or more alkanes, such as $C_1$-$C_{10}$ alkanes; one or more alkenes, such as $C_2$-$C_{10}$ alkenes; one or more cycloalkanes, such as $C_3$-$C_{10}$ cycloalkanes; one or more cycloalkenes, such as $C_3$-$C_{10}$ cycloalkenes; one or more aryl (aromatic) groups, such as $C_5$-$C_{10}$ aryl groups; or a mixture thereof. In specific examples, the hydrocarbon fuel can include methane. In other specific examples, the hydrocarbon fuel can be derived from a syngas. A syngas, as used herein, refers to a mixture of carbon monoxide, carbon dioxide, hydrogen, and other gases that are produced when a carbon containing fuel reacts with steam and oxygen. Sources of carbon can include coal, biomass, and municipal solid wastes. The fuel can be solid, liquid, or gaseous.

In the case when carbonaceous fuels are used, an oxygen carrier in the presence of a catalyst can be used to reform the fuel into for example, hydrogen, carbon dioxide, and/or carbon monoxide.

Catalyst

The catalyst used in chemical looping reform can be selected from a perovskite catalyst, a nano-yolk shell catalyst, a nano-shaped catalyst on supported nano-metal particles, a nano-carbide catalyst, a doped graphene based catalyst, zeolite, or a mixture thereof.

In some embodiments, the catalyst may be present in the form of a metal oxide. For example, the catalyst can include a perovskite. The perovskite can have a formula $A_xB_{1-x}MO_3$, wherein A is a lanthanide, B is a polyvalent cation, M is a transition metal, and x is a number defined by $0.02<x<0.98$. Lanthanides can include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). The polyvalent cation can include an alkaline earth metal, a rare earth metal, a lanthanide, or an actinide metal (such as actinium, thorium, protactinium, uranium, neptunium, plutonium, americium, curium, berkelium, californium, einsteinium, fermium, mendelevium, nobelium, and lawrencium). Preferably, the polyvalent cation comprises a rare earth metal such as cerium. The transition metal can include Fe, Co, Ni, Cu, Zn, Ru, Ir, Pt and the like.

In some aspects, the perovskite can be nickel based having a formula $A_xB_{1-x}NiO_3$, wherein A is a lanthanide, B is a polyvalent cation, and x is a number defined by $0.02<x<0.98$. In some examples, the perovskite can have a formula $La_xCe_{1-x}NiO_3$, wherein x is a number defined by $0.02<x<0.98$. In one specific example, the perovskite can have a formula $La_{0.9}Ce_{0.1}NiO_3$.

Oxygen Carrier

Traditionally the chemical energy stored inside fuels such as coal has been utilized by combustion with oxygen with carbon dioxide and water as products. Similar reactions can be carried out if instead of oxygen, an oxygen carrier is used. Metal oxides such as iron oxide can act as suitable oxygen carriers. However, unlike combustion of fuel with air, there is a relatively pure sequestration ready carbon dioxide stream produced on combustion with metal oxide carriers. The reduced form of metal oxide can then be reacted with air to liberate heat to produce electricity or reacted with water to form a relatively pure stream of hydrogen, which can then be used for a variety of purposes.

The oxygen carrier used in the chemical looping reforming reactions disclosed herein can include a metal or its oxide, a rare metal oxide, or a perovskite as known in the art. In some aspects, the oxygen carrier can include a metal oxide oxygen carrier. The metal oxide oxygen carrier can comprise a metal such as cerium, nickel, copper, iron, cobalt, manganese, aluminum, titanium, zirconium, silicon, lanthanum, magnesium, or a mixture thereof. In some examples, the oxygen carrier includes a rare earth metal oxide. Such rare earth metal oxides can include cerium oxide (ceria). Ceria can strongly enhance the stability of the catalyst and increase its reactivity in redox processes.

One of the problems, however, with the prior art in chemical looping systems has been the metal/metal oxide oxygen carrier. For example, iron in the form of small particles will degrade and its activity and oxygen carrying capacity drops off considerably after a few redox cycles. Replacing the oxygen carrier with additional fresh metal/metal oxide makes the process uneconomical. Further, most oxygen carriers have almost no reactivity at low temperatures, such as below 600° C. Thus, provided herein are oxygen carriers that have considerable oxygen storage capacity and are reactive at low temperatures. In some embodiments, the oxygen carriers described herein can be employed both as catalysts and as oxygen carriers for various oxidation chemistries.

In particular, a synergistic chemical looping reform catalytic effect was surprisingly found by combining a perovskite with a rare earth metal oxygen carrier such as ceria. Without wishing to be bound by theory, the synergy between the two materials is believed to be due to the shared high oxygen ion mobility characteristics and synergistic interface transfer chemistry, while achieving the higher oxygen carrying capacity with ceria content in the mixture required for chemical looping. Ceria can release lattice oxygen under oxygen lean conditions and store oxygen under oxygen rich conditions, mainly accommodated by a reversible valence change of cerium ions ($Ce^{4+}e^- \leftarrow Ce^{3+}$ or $O^{2-}+2Ce^{4+} \leftarrow 2Ce^{3+}+1/2O_2(g)$) with formation or elimination of oxygen vacancies.

Preferably, the perovskite used is nickel-based. For example, the perovskite can have a formula $A_xB_{1-x}NiO_3$, wherein A is a lanthanide, B is a polyvalent cation, and x is a number defined by $0.02<x<0.98$. In specific examples, the perovskite can have a formula $La_xCe_{1-x}NiO_3$, wherein x is a number defined by $0.02<x<0.98$.

The rare earth metal oxide oxygen (such as ceria) and the perovskite can be combined in a weight ratio of from 1:5 to 5:1. For example, the weight ratio of the rare earth metal oxide oxygen and the perovskite can be from 1:5 to 4:1, from 1:5 to 3:1, from 1:5 to 2:1, from 1:5 to 1:1, from 1:4 to 5:1, from 1:3 to 5:1, from 1:2 to 5:1, from 1:1 to 5:1, from 1:4 to 4:1, from 1:3 to 3:1, or from 1:2 to 2:1.

In some aspects, the perovskite and the rare earth metal oxide can be sintered to form the combined catalyst and oxygen carrier. The sintered perovskite and the rare earth metal oxide can have a BET surface area of 10 $m^2/g$ or greater. For example, the sintered perovskite and the rare earth metal oxide can have a surface area of 12 $m^2/g$ or greater, 14 $m^2/g$ or greater, 15 $m^2/g$ or greater, 16 $m^2/g$ or greater, 17 $m^2/g$ or greater, 18 $m^2/g$ or greater, 20 $m^2/g$ or greater, or 25 $m^2/g$ or greater. In some embodiments, the sintered perovskite and the rare earth metal oxide can have a surface area of 25 $m^2/g$ or less, 22 $m^2/g$ or less, 20 $m^2/g$ or less, 15 $m^2/g$ or less, or 12 $m^2/g$ or less. In some embodiments, the sintered perovskite and the rare earth metal oxide can have a surface area of from 10 $m^2/g$ to 25 $m^2/g$, from 10 $m^2/g$ to 20 $m^2/g$, from 12 $m^2/g$ to 20 $m^2/g$, or from 12 $m^2/g$ to 18 $m^2/g$.

The sintered perovskite and the rare earth metal oxide can have an average particle size of 150 nm or less, as determined by SEM images. For example, the sintered perovskite and the rare earth metal oxide can have an average particle size of 125 nm or less, 115 nm or less, 110 nm or less, 105 nm or less, 100 nm or less, 95 nm or less, 90 nm or less, 85 nm or less, 80 nm or less, 75 nm or less, 70 nm or less, 65 nm or less, 60 nm or less, 55 nm or less, or 50 nm or less, as determined a SEM images. In some embodiments, the sintered perovskite and the rare earth metal oxide can have an average particle size of 50 nm or greater, 55 nm or greater, 60 nm or greater, 65 nm or greater, 70 nm or greater, 75 nm or greater, 80 nm or greater, 85 nm or greater, 90 nm or greater, or 95 nm or greater, as determined by SEM images. In some embodiments, the sintered perovskite and the rare earth metal oxide can have an average particle size of from 50 to 100 nm, from 50 to less than 100 nm, from 50 to 90 nm, from 50 to 80 nm, from 50 to 75, nm, from 60 to 90 nm, or from 60 to 80 nm, as determined by SEM images.

The combined amount of oxygen carrier and catalyst (such as the sintered perovskite and rare earth metal oxide) used in the chemical looping reform methods can vary depending on the size of the reactor and flow rate of the reactants. In some embodiments, the combined amount of oxygen carrier and catalyst (such as the sintered perovskite and rare earth metal oxide) can be present in an amount of greater than 1 mg to 1 kg, such as 10 mg or greater, 50 mg or greater, 100 mg or greater, 150 mg or greater, 200 mg or greater, 0.5 g or greater, 1 g or greater, 5 g or greater, 10 g or greater, or 50 g or greater, depending on the size of the reactor and flow rate of the reactants.

Methods of Making Catalyst

Provide herein are also methods of preparing a catalyst for use in the chemical looping reform methods. The catalyst can include a rare earth metal oxide sintered with a perovskite, wherein the perovskite is defined by a formula $A_xB_{1-x}MO_3$ as described herein.

Methods for preparing the catalyst can include mixing salts to form a homogenous mixture. The homogenous mixture of salts may be in a form of a solution or a solid. For example, the homogenous mixture can be formed by dissolving a single phase lanthanide salt, together with salts containing elements B and M, respectively, in a solution such as water and also can be formed by dissolving in acid, e.g., citric acid. The mixture may also be formed by grinding a single phase lanthanide salt with salts or oxides of elements B and M. Other methods known for forming the homogenous mixture can also be used.

The salts used in the methods described herein can include nitrates, carbonates, hydroxides, acetates, oxalates, or chlorides of component elements A, B, and M. Oxides of B and M may also be used to make the homogenous mixture. The amount of each salt used is a function of the desired composition in the final perovskite compound.

In specific examples, the perovskite can be prepared by dissolving salts of Ni, La, and Ce to form a homogenous solution. For example, the following salts can be dissolved in a solution such as water to form a homogenous mixture: a single phase lanthanide salt, such as, but not limited to, single phase mixed hydrated lanthanide carbonate, single phase mixed hydrated lanthanide nitrate or the like; a salt of element B, such as, but not limited to, cerium nitrate hexahydrate or the like; and one or more salts of element M, such as, but not limited to, cobalt nitrate hexahydrate, hydrated manganese nitrate, hydrated chromium nitrate, hydrated iron nitrate, hydrated palladium nitrate, hydrated nickel nitrate or the like.

Citric acid and/or ethylene glycol can be added and dissolved into the solution as complexing agents.

A precipitate of the perovskite can be formed from the mixture by techniques such as, but not limited to, pelletizing, spray-drying, sintering, or calcination. These techniques may be used alone or in combination to obtain the precipitated perovskite.

In some embodiments, the method can include heating the homogenous salt solution for evaporation of the water in air. Said another way, the homogenous salt solution can be dried to form a salt mixture. The salt mixture can be calcined to a temperature of 300° C. or higher to form a calcined perovskite. In some embodiments, the salt mixture is calcined at a temperature range of from 300-600° C. in air for about 1-25 hours such as from 1 to 10 hours or from 2 to 6 hours. Periodic grinding during the calcining process is preferred. In specific embodiments, where salts of Ni, La, and Ce are used, the calcined perovskite can have a formula $La_{1-x}Ce_xNiO_3$, wherein x is a number defined by $0.02 < x < 0.98$.

The calcined perovskite can be blended with an additional element or material if desired. Preferably, the calcined perovskite is blended with a rare earth metal oxide oxygen carrier to form a blend. The perovskite and the rare earth metal oxide oxygen carrier can be blended in a weight ratio of from 1:5 to 5:1, preferably from 1:2 to 2:1.

The rare earth metal oxide oxygen carrier can be precipitated, powdered, and/or sintered with the calcined perovskite to form the catalyst. Preferably, the rare earth metal oxide oxygen carrier is sintered with the calcined perovskite. For example, a powdered rare earth metal oxide oxygen carrier such as ceria can be blended with the calcined perovskite and then sintered at temperatures from 600 to 1000° C., preferably from 600 to 800° C., to form the catalyst. The catalyst can be further ground or formed into pellets or beads.

The catalysts prepared by the methods described herein preferably have the perovskite structure. X-ray diffraction analysis can be used to show the perovskite structure of materials, and the presence, if any, of second phases or impurity phases. In particular, the X-ray diffraction structural analysis of the as-prepared powder (for example, $La_{0.9}Ce_{0.1}NiO_3+CeO_2$ (LCN91Ce)) can be executed in a Philips X'Pert MPD diffractometer. The diffraction patterns can be recorded using Cu Kα source ($\lambda=0.154$ nm) in the range of 2θ between 10° and 90° with a step size of 0.05°/min. The particle size and elemental mapping of the powders can be characterized by scanning electron microscope (SEM; JEOL 7000 FE) coupled with an energy dispersive X-ray spectrometer (EDS). The Brunauer, Emmett and Teller (B.E.T.) surface area can be measured by a gas absorption apparatus for proving how fine-grained the powder is. For example, $N_2$ physisorption at ~77 K (liquid nitrogen temperature) can be used to determine the single point BET surface area of the sample in a Micromeritics AutoChem™II 2920 chemisorption analyzer.

The catalyst formed from sintering the rare earth metal oxide oxygen carrier and the perovskite can have a BET surface area of 10 $m^2/g$ or greater, preferably from 10 $m^2/g$ to 20 $m^2/g$. The catalyst can have an average particle size of from 50 nm to 100 nm, as determined by SEM images.

The catalyst formed from sintering the rare earth metal oxide oxygen carrier and the perovskite can be used in any one of the methods disclosed herein. For example, the catalyst can be used in chemical looping reform methods. The catalyst formed from sintering the rare earth metal oxide oxygen carrier and the perovskite can provide a synergistic catalytic effect during the chemical looping reform methods, specifically during reaction of the oxygen carrier with hydrocarbon.

Methods of Chemical Looping Reform

As described herein, chemical looping reform methods are described herein. In some examples, the methods described herein can include heating an oxygen carrier in the presence of a catalyst and plasma radicals to react the oxygen carrier with a fuel to provide a reduced oxygen carrier. As described herein, the fuel can include a carbonaceous material such as a hydrocarbon. The flow rate of the fuel can vary, for example depending on the size of the reactor and the amount of catalyst. In some examples, the flow rate of the fuel can be 10 sccm or greater, such as 20 sccm or greater, 50 sccm or greater, 75 sccm or greater, 100 sccm or greater, 150 sccm or greater, 200 sccm or greater, 250 sccm or greater, 300 sccm or greater, 500 sccm or greater, 750 sccm or greater, or 1000 sccm or greater. In these embodiments, the oxygen carrier and the fuel can react to provide a mixture comprising $CO_2$, $H_2O$, and the reduced oxygen carrier.

The flow during the reduction cycle can include a mixture of the fuel (carbonaceous material) and a carrier gas. The carrier gas can include, for example, carbon dioxide. The flow rate of the carrier gas can vary, for example depending on the size of the reactor. In some examples, the flow rate of the carrier gas can be 50 sccm or greater, such as 75 sccm or greater, 100 sccm or greater, 150 sccm or greater, 200 sccm or greater, 250 sccm or greater, 300 sccm or greater, 350 sccm or greater, 400 sccm or greater, 500 sccm or greater, 750 sccm or greater, or 1000 sccm or greater.

The total flow rate of gases during the reduction cycle can be 100 sccm or greater, such as 150 sccm or greater, 200 sccm or greater, 250 sccm or greater, 300 sccm or greater, 350 sccm or greater, 400 sccm or greater, 500 sccm or greater, 750 sccm or greater, or 1000 sccm or greater. The volume ratio between the fuel (such as methane) and the carrier gas (such as carbon dioxide) can be 1:5 to 5:1. For example, the weight ratio of the fuel and the carrier gas can be from 1:5 to 4:1, from 1:5 to 3:1, from 1:5 to 2:1, from 1:5 to 1:1, from 1:4 to 5:1, from 1:3 to 5:1, from 1:2 to 5:1, from 1:1 to 5:1, from 1:4 to 4:1, from 1:3 to 3:1, or from 1:2 to 2:1.

One embodiment of the instant disclosure includes providing low temperature chemical looping reform methods, which can enable the development of efficient reactors using waste heat, wind energy or solar energy. In some embodiments, the entire chemical looping reform methods (including both oxidation and reduction cycles) can be carried out at a temperature of 1000° C. or less, such as 950° C. or less, 900° C. or less, 850° C. or less, 800° C. or less, 750° C. or less, 700° C. or less, 650° C. or less, 600° C. or less, 550° C. or less, 500° C. or less, 450° C. or less, 400° C. or less, 350° C. or less, 300° C. or less, 250° C. or less, 200° C. or less, or 150° C. or less. In some embodiments, the chemical looping reform methods can be carried out at a temperature from 150° C. to 1000° C., from 150° C. to 900° C., from 150° C. to 750° C., from 150° C. to 650° C., from 150° C. to 600° C., from 150° C. to 550° C., from 150° C. to 500° C., from 200° C. to 500° C., or from 300° C. to 500° C.

The plasma radicals used in the chemical looping reform methods can be generated at an average power of from 1 W to 6 W, preferably from 2 W to 6 W, per 200 mg of the combined catalyst and oxygen carrier. However, more efficient low power (such as in the mW range per 200 mg combined catalyst and oxygen carrier) surface plasma can be generated using semiconductor fabrication methods. In some embodiments, the plasma radicals are continuously generated throughout the reaction, that is during the oxidation and reduction cycles. Specific examples of plasma radicals can include radicals from the fuel or radicals from $CO_2$, $H_2O$, other components in the reaction mixture, or a combination thereof. In some examples, the plasma radicals can include $CH_x$ radicals such as $CH_3$, $CH_2$, and CH;

$C_2H_x$ radicals such as $C_2$, and $C_2H_4$; aromatic radicals, H radical, CO radical, or a mixture thereof.

The chemical looping reform methods can further include contacting the reduced oxygen carrier with water to produce hydrogen and regenerate the oxygen carrier. The water can be provided in the presence of a gas. selected from argon, nitrogen, or a combination thereof. In some examples, the water is provided in the absence of a gas including oxygen, such as or in the absence of air. In some cases, the gas can be any inert gas or mixture of gases that do not include oxygen. In some embodiments, the water can be provided as pure water in the absence of any added gas.

Alternately, the chemical looping reform methods can include contacting the reduced oxygen carrier with carbon dioxide to produce carbon monoxide and regenerate the oxygen carrier. In some cases, the reduced oxygen carrier can be contacted with both carbon dioxide and water.

The flow rate of gases during the oxidation cycle can be the same as the reduction cycle, such as 100 sccm or greater, 150 sccm or greater, 200 sccm or greater, 250 sccm or greater, 300 sccm or greater, 350 sccm or greater, 400 sccm or greater, 500 sccm or greater, 750 sccm or greater, or 1000 sccm or greater. For an oxidation cycle wherein the gas consists essentially of water vapor and argon, the water vapor can be present at a volume % of 1% or greater, 2% or greater, 3% or greater, 4% or greater, 5% or greater, 6% or greater, 7% or greater, 8% or greater, 9% or greater, 10% or greater, from 1% to 15%, or from 2% to 10%, based on the volume of gases present in the oxidation cycle.

The chemical looping reforming methods can be performed in a rotary bed reactor, a packed bed reactor, or a ceramic honeycomb. For example, the chemical looping reforming method can be performed in a rotary reactor comprising a reactor member comprising a channel extending therethrough, the reactor member configured to provide an oxygen carrier and a perovskite catalyst, a feeding chamber in communication with the reactor member, the feeding chamber partitioned into a plurality of sectors for delivery of a selected pressurized feed gas into the channel of the reactor member, a plasma driver for generating plasma radicals from the feed gas prior to entering the reactor member, an exit chamber partitioned into at least two sectors through which separate gas streams emerge, and a means for rotating the reactor member at a selected angular velocity. The sectors in the feeding chamber can include a hydrocarbon sector, a carbon dioxide sector, a water sector, and an argon sector. The sectors in the exit chamber are for hydrogen and combustion products. The oxygen carrier and the catalyst can be disposed on a wall of the channel.

The methods described herein can provide at least 15%, preferably up to 40%, more preferably up to 50% or from 15% to 50% conversion of the hydrocarbon at an input flow rate (i.e., the combined flow rate of hydrocarbon and carrier gas) of 350 sccm and 150° C. In some embodiments, the methods can provide at least 40%, preferably up to 70%, more preferably up to 80% or from 40% to 80% conversion of the hydrocarbon at an input flow rate of 350 sccm and 400° C. The flow rates, however, can vary (that is less than or greater than 350 sccm) depending on reactor size.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1: Plasma-Catalysis Chemical Looping $CH_4$ Reforming with Water Splitting using Ni Based La-perovskite Nnano-Catalyst Supported Ceria Chemical looping reactions have the advantage of producing useful chemicals, with minimal energy penalty while achieving Carbon Capture Sequestration (CCS). Presented In this example are results of Plasma Catalytic (PC) $CH_4$ reforming reduction cycle coupled with PC water splitting oxidation cycle to produce hydrogen. The $CH_4+CO_2$ flow reduction cycle was used with nano-powder, 50:50 mass ratio of $La_{0.9}Ce_{0.1}NiO_3$ perovskite with $CeO_2$ solid mixture as catalyst with Oxygen Carrier (OC) combination. The material was oxidized with $H_2O+Ar$ during the oxidation cycle leading to $H_2$ production by water splitting. Plasma-assisted reforming and water splitting, with the purpose of achieving significant reactions at low temperatures (150-400° C.) was achieved. Significant water splitting $H_2$ production (24-30 μmole/g total) and $CH_4$ reforming (14-43% conversion) was observed in the 150-400° C. temperature range, while no such reactions were observed without plasma in this low temperature range, with just the oxygen carrier nano-materials. Significant enhancements were also observed at higher temperatures.

In CLR with water splitting, combustion is decomposed into two "redox" steps (FIG. 1)—reduction and oxidation. The redox reactions take place in two separate chambers. Fuel is oxidized by a metal oxide ($Me_xO_y$) in a fuel reactor to generate CO, $H_2$, $CO_2$, and $H_2O$; during reduction cycle, water vapor is flown over the "reduced" metal oxide ($Me_xO_{y-1}$) to re-oxidize it while producing pure $H_2$. Here, OC material can be a transition metal (ex. Fe, Cu, Ni, Co) or their oxides, oxides ($CeO_2$) or even a perovskite oxide.

Some of the most commonly studied OCs are nickel, copper, iron, and manganese-based OCs. Expensive noble metals like Pt and Ru show higher catalytic activity and less coke formation in case of dry reforming of methane. Nickel-based OC, which also acts as a catalyst, has been investigated significantly and was reported to greatly improve the reforming of methane. Coke formation and agglomeration are primary concerns with Ni-based OC.

Recently, plasma-catalysis (PC) has received much attention due to the possible synergy between nano-catalysts and non-equilibrium low temperature electric plasma discharge. PC has been found to enhance plasma combustion and heterogeneous reactions at low temperatures. Whitehead et al., demonstrated the experimental PC synergy in the destruction of toluene, considered as an example of atmospheric pollutant, achieving significant energy efficiency over just catalytic or plasma process. They also found an energy saving of ~34% using the plasma-catalyst combination. Other promising results of PC synergy have been summarized in several reviews. More recently, Mehta et al. showed the possible advantages of $N_2$ vibrational excitation in PC synthesis of $NH_3$ through DFT calculations.

The goal of this example is to achieve CLRs at much lower temperatures (150-500° C.), which could enable the development of efficient reactors using waste heat, wind energy or solar energy. PC was adopted to achieve the aforementioned goal using nano-powder 50:50 mass ratio of $La_{0.9}Ce_{0.1}NiO_3$ and $CeO_2$ solid mixture as catalyst with OC combination. The $La_{0.9}Ce_{0.1}NiO_3$ has been found to be a very good $CH_4$ reforming catalyst while $CeO_2$ is known for high lattice and surface oxygen ion mobility leading to faster reaction rates and lesser carbon deposition. $CeO_2$ also has a very good oxygen carrying capacity (oxygen storage and fast release capacity).

The examples described herein achieve simultaneous CLR (reduction step) and water splitting (oxidation step) at much lower temperatures (150-500° C.), which could enable the development of efficient reactors using renewable energy sources. PC was adopted in this example using nano-powder 50:50 mass ratio of $La_{0.9}Ce_{0.1}NiO_3$ and $CeO_2$ solid mixture as catalyst and OC combination. The $La_{0.9}Ce_{0.1}NiO_3$ has been found to be a very good $CH_4$ reforming catalyst while $CeO_2$ is known for high lattice and surface oxygen ion mobility leading to faster reaction rates and lesser carbon deposition. $CeO_2$ also has a very good oxygen carrying capacity (oxygen storage and fast release capacity). It is possible that both perovskite and ceria are oxygen carriers in this example.

Although not much is known, possible surface synergistic plasmacatalysis reaction mechanisms may occur in which the gas phase $CH_4$ combustion generally proceeds by H abstraction reactions by attack of O, OH, $O_2$ radicals. The intermediate products of $CH_4$ combustion include species such as CHx (x=1-3), $CH_3O$, $CH_2O$, HCO, and COOH. Since plasma can dissociate $CH_4$, by electron impact, into radicals such as CHx (x=1-3) and H and can also dissociate $CO_2$ to CO and O, the gas phase reactions are enhanced at low temperatures. Additionally, these plasma generated radicals and vibrationally excited species can readily adsorb on the CL material, perovskite-ceria interface and react with lattice oxygen ions. Therefore a complex gas phase coupled heterogeneous reaction chemistry is expected during the reduction step. All surface reaction mechanisms Mars-van Krevelen (MvK), Eley-Rideal (ER) and Langmuir Hinshelwood (LH) mechanisms are expected to be dominant and coupled in a complex manner. Strong Metal Support Interaction (SMSI) between ceria support and perovskite can play an important role in the surface chemistry of both reduction and oxidation step, and reduce carbon deposition by reacting with it to produce CO. During the water splitting step, plasma dissociates $H_2O$ into OH, O and H radicals providing a higher than normal $O_2$ fugacity, or $P(O_2)$, over the CL material, leading to its more complete oxidation. The H radicals can combine to $H_2$ after losing the O atom to the CL material.

Catalyst preparation and structural characterization: The nickel based perovskite catalyst ($La_{0.9}Ce_{0.1}NiO_3$) was prepared in a three step sol-gel process. $Ni(NO_3)_2.6H_2O$ (99.9985%, Alfa Aesar), $La(NO_3)_3.6H_2O$ (99.90%, Alfa Aesar), and $Ce(NO_3)_3.6H_2O$ (99.50%, Alfa Aesar) were used to prepare nitrate precursor solutions. The nitrate salts of the perovskite catalyst are mixed together in the proper ratios with distilled water to create an aqueous solution. Citric acid (99.0%, Alfa Aesar) and ethylene glycol (>99.5%, TCI) are also added into the solution as complexing agents. The solution in a glass beaker was placed on a heated hotplate and with a magnetic stirrer, until all the water was evaporated. The dry precipitate was then hand ground using agate mortar and pestle and calcined at a temperature of 300° C. for 5 h in the box furnace. The perovskite powder was then removed and hand ground using agate mortar and pestle, after which it was calcined for a second cycle at 600° C. for 3 h. After the preparation of $La_{0.9}Ce_{0.1}NiO_3$ perovskite powder (50 nm), it was then combined with 1 μm size $CeO_2$ powder in a 50:50 mass ratio. This mixture was then sintered at 1000° C. for 30 min and was hand ground for 10 min using agate mortar and pestle. A total mass of 200 mg was used in all the experiments.

The X-ray diffraction structural analysis of the as-prepared powder ($La_{0.9}Ce_{0.1}NiO_3+CeO_2$ (LCN91Ce)) and the powders after high temperature and plasma treatments was executed in a Philips X'Pert MPD diffractometer. The diffraction patterns were recorded using Cu Kα source (λ=0.154 nm) in the range of 274 between 10° and 90° with a step size of 0.05° /min. The particle size and elemental mapping of the powders were characterized by scanning electron microscope (SEM; JEOL 7000 FE) coupled with an energy dispersive X-ray spectrometer (EDS). $N_2$ physisorption at ~77 K (liquid nitrogen temperature) was used to determine the single point BET surface area of the sample in a Micromeritics AutoChem™II 2920 chemisorption analyzer. The CL materials were characterized by SEM/XRD before and after redox reactions.

Figure 2:
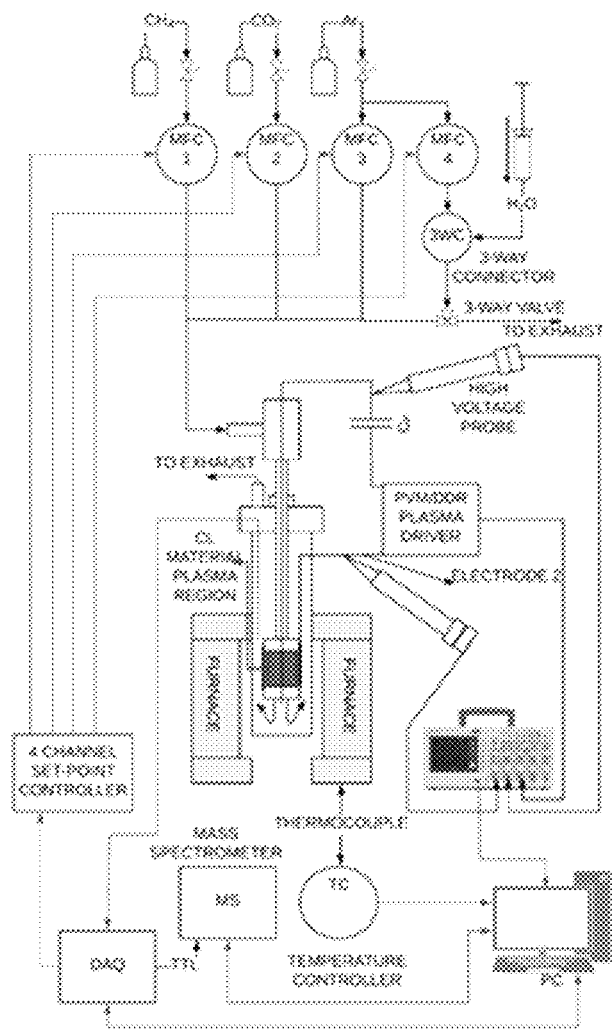
FIG. 2 is a schematic drawing of a chemical looping test station setup.

Reactor setup: The CL test station contained four parts—a gas delivery system, a central quartz reactor tube, experimental control section, and a flue gas analysis system. The design is based on that of Tianjiao Chen, modified for plasma discharge. The system layout and details of the reactor are shown in FIG. 2. The gas delivery system contains four Brooks GF040 Multiflo thermal mass flow controllers (MFC), with <1 s response times, which are controlled by a computer interface with a NI card. The NI card is controlled using a home written MATLAB GUI code. Gases with purity >99.99% from Airgas, such as Ar, $CH_4$, $CO_2$, $O_2$ flow through these MFCs. A mixture of $CH_4$ and $CO_2$ was flowed during the reduction cycle. Pure Ar is flown during the purging cycle. The oxidation cycle involves $H_2O$ vapor and Ar mixture flow or Ar with $O_2$. Liquid water can be injected into the heated Ar flow line, using an automated syringe pump from New Era Pump Systems, which vaporizes as it enters the reactor for the oxidation cycle.

The reactor contains two concentric quartz tubes, which are placed inside an ATS 3211 split tube furnace. The furnace can heat up to 1100° C. and provide an isothermal environment. The reactive gases are flowed into the inner tube first which exits at the open end inside the outer tube, reverses direction and flows out to the exhaust. The inner quartz tube is of ¼" outer diameter (OD) with an expansion section of ⅜" inner diameter (ID) and 2" length. The reactive CL material, dispersed in quartz wool, is placed inside the expansion section of the inner quartz tube, directly in the plasma as will be explained. The outside tube is of 1" OD and closed at one end.

A tiny capillary quartz probe (0.80 mm OD, 0.53 mm ID), is used to sample the gases and measure time resolved species at the probe end location, at the exit of the inlet tube expansion section where the CL material is placed in plasma. To analyze the gas composition a quadrupole mass spectrometer (QMS, model: MAX300-EGA from Extrel, 300 ms, 1-250 amu detectability), is used. The QMS is calibrated by flowing known mixture of gases. Signals at m/e=40, 44, 32, 2, 15, 18, 28 are used to measure Ar, $CO_2$, $O_2$, $H_2$, $CH_4$, $H_2O$, CO. $CO_2$ interferes with CO signals at 28 and its signals at 14 and 44 are used to correct the signals at 28 for CO. The QMS calibration showed measurements to be accurate within ±0.5%. All the gases ($H_2O$, $CO_2$, CO, $H_2$, $CH_4$, Ar, $O_2$) flowed simultaneously for the calibration.

The flow conditions affecting gas residence time and the QMS sensitivity measurements were studied before the experiments. More details of similar analysis can be found in the literature. With increasing gas flow velocity, the gas residence time in the CL region decreases while the QMS sensitivity to species measurements decreased due to large dilution of Hz by the balance gas, Ar in our case. A lower flow rate increases gas residence time and makes it comparable to reaction time constants (5-10 s) seen in the experiments. Therefore, an optimum total volume flow rate of 350 sccm was chosen for the experiments. With this flow condition, the gas residence time at the CL material region is <0.5 s. This is calculated by dividing the CL region volume by the gas volume flow rate at the reactor temperature. This enables quasi-steady approximations for Plug Flow Reactor (PFR) heterogeneous reaction numerical modeling purposes.

The plasma generation setup contains two electrodes: one at the center of the inner inlet tube inside a 0.063 ID ceramic tube and the other on the outside of the expansion section of the inner tube, giving rise to non-equilibrium Dielectric Barrier Discharge (DBD). One of the electrodes is directly connected to the RF discharge power supply, PVM/DDR plasma driver while the other electrode connected via a 1nF capacitor to the driver. The voltages are measured using two High Voltage Probes (HVPs) connected to the wires connecting the electrode to the plasma driver. The voltages on the HVPs are measured on an oscilloscope and processed to draw Lissajous curves to find the plasma power input by the method explained by Marcin Holub.

Figure 12:
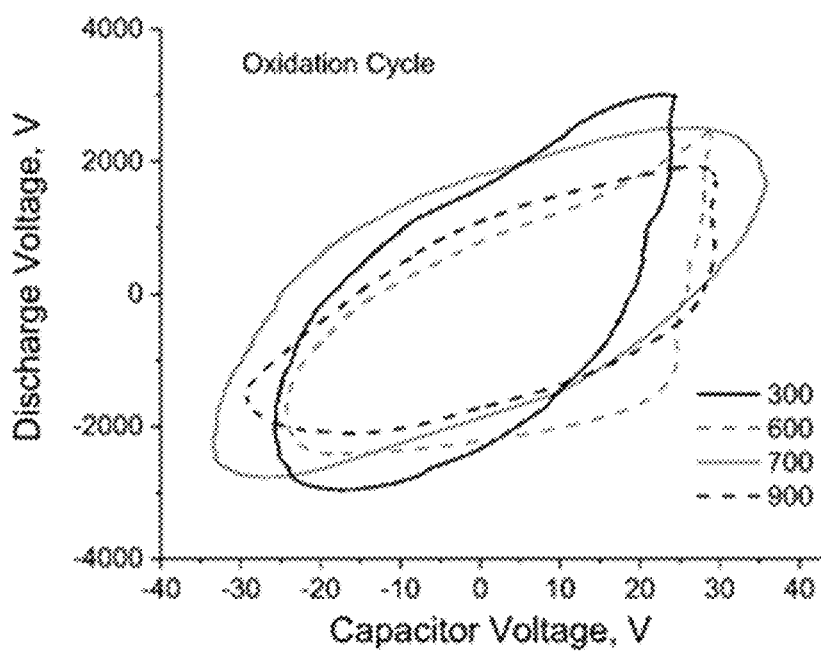
FIG. 12 is a Lissajous curve for oxidation cycle at different temperatures.

FIG. 12 shows the typical Lissajous curve obtained during the oxidation cycle, used to measure plasma input power. In this graph, the discharge voltage is plotted against the capacitor voltage. The power is calculated using a variation of Manley's approach using the formula:

$$P = f \cdot E = f \cdot \oint U_T \frac{dQ}{dt} dt = f \cdot C_P \oint U(t) dU_P \quad (8)$$

Here $C_p$ is an additional capacitor used for measurement whose value is 1 nF in our experiments. U(t) is the discharge voltage, Up is the capacitor voltage, f is the frequency of plasma discharge which is 20 kHz. The area in the loops of FIG. 12 is proportional to the plasma power supply. The measured average power during the redox cycles was in the range of 2-6 W for all temperatures. The plasma is kept on during the continuous chemical looping experiments while furnace temperature is maintained at a constant level. However, more efficient low power (less than 1 W per 200 mg combined catalyst and oxygen carrier) surface plasma can be generated using semiconductor fabrication methods.

The measured concentrations of species are plotted as a function of time and used to study the reactions. The total flow rate of gases was maintained at 350 sccm (Standard Cubic Centimeter/min) during all the redox and purge cycles. The flow during the reduction cycle is a mixture of $CH_4$ (100 sccm or 28.6 vol. %) and $CO_2$ (250 sccm or 71.4 vol. %). Ar is used as purge gas. The flow during the oxidation cycle contains argon and water vapor (2~10% $H_2O$ with Ar). All experiments were conducted at 1 atm pressure, and in the temperature range of 150-1000° C.

A single repeated CL cycle involves a reduction cycle for 3 min followed by a purge cycle for 3 min and an oxidation cycle for 1 min followed by a purge cycle for 3 min. Four different sets of experiments were conducted: (1) no CL material, no plasma; (2) no CL material, with plasma; (3) with CL material and no plasma; (4) with CL material and plasma. Experiments without plasma (case 3) were conducted by decreasing the reactor temperature from 1000° C. to 150° C. Experiments with plasma and CL material (case 4) were conducted by first increasing the temperature (ramp up), and then, while decreasing the temperature (ramp down) in the same temperature range, to study the change in PC material behavior due to extreme temperature cycling.

Gas conversion analysis: To compare the performance with and without plasma during the reduction cycles, the most important parameters are to quantify gaseous species conversion, selectivity, and yield. The gas conversion (Eqns. 1, 2) is the ratio of the total amount of reactant consumed to the total amount of input reactant. The selectivity (Eqns. 3, 4) is defined as the ratio of desired product produced to the ratio of total reactant consumed. The yield of a reaction (Eqns. 5, 6) is defined as the ratio of the desired product produced to the total amount of reactant used. These terms are useful in identifying the consumption of the reactant, formation of the desired product and the selectivity towards a desired product. Carbon balance (Eqn. 7) is used to check for conservation in carbon atoms. The carbon deposition during reduction cycle is seen as $CO_2$ evolution during the oxidation cycle and is included in Eqn. 7 for carbon balance analysis.

$$CH_4 \text{ Conversion } (X_{CH_4}) = \left[\frac{\text{Moles of } CH_4 \text{ consumed}}{\text{Moles of } CH_4 \text{ input}}\right] \times 100(\%) \quad (1)$$

$$CO_2 \text{ Conversion } (X_{CO_2}) = \left[\frac{\text{Moles of } CO_2 \text{ consumed}}{\text{Moles of } CO_2 \text{ input}}\right] \times 100(\%) \quad (2)$$

$$CO \text{ Selectivity } (S_{CO}) = \left[\frac{\text{Moles of CO formed}}{\text{Moles of } CH_4 \text{ consumed} + \text{Moles of } CO_2 \text{ consumed}}\right] \times 100(\%) \quad (3)$$

$$H_2 \text{ Selectivity } (S_{H_2}) = \left[\frac{\text{Moles of } H_2 \text{ formed}}{2 \times \text{Moles of } CH_4 \text{ consumed}}\right] \times 100(\%) \quad (4)$$

$$CO \text{ Yield } (Y_{CO}) = \left[\frac{\text{Moles of CO formed}}{\text{Moles of } CH_4 \text{ input} + \text{Moles of } CO_2 \text{ input}}\right] \times 100(\%) \quad (5)$$

$$H_2 \text{ Yield } (Y_{H_2}) = \left[\frac{\text{Moles of } H_2 \text{ formed}}{2 \times \text{Moles of } CH_4 \text{ input}}\right] \times 100(\%) \quad (6)$$

$$\text{Carbon Balance} = \left[\frac{\begin{array}{c}\text{Sum of Moles of CO, } CO_2 \\ \text{and } CH_4 \text{ formed (reduction)} + \\ \text{Moles of } CO_2 \text{ formed (oxidation cycle)}\end{array}}{\text{Moles of } CH_4 \text{ input} + \text{Moles of } CO_2 \text{ input}}\right] \times 100(\%) \quad (7)$$

Figure 3:
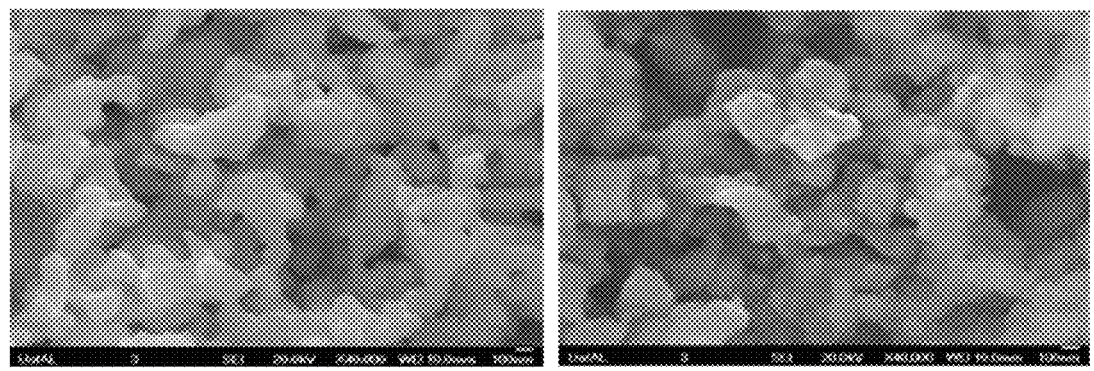
FIG. 3 is an image showing LCN91Ce before (left) and after (right) chemical looping reforming experiment.

CL material characterization: SEM images (FIG. 3) show the size of all particles to be in the range 100-200 nm, before and after redox cycling. No significant changes in particle size were observed after the CLR cycling up to 1000 C, as seen from the SEM images. The BET surface area of fresh $La_{0.9}Ce_{0.1}NiO_3$—$CeO_2$ sample was 10.54 $m^2/g$.

Figure 4:
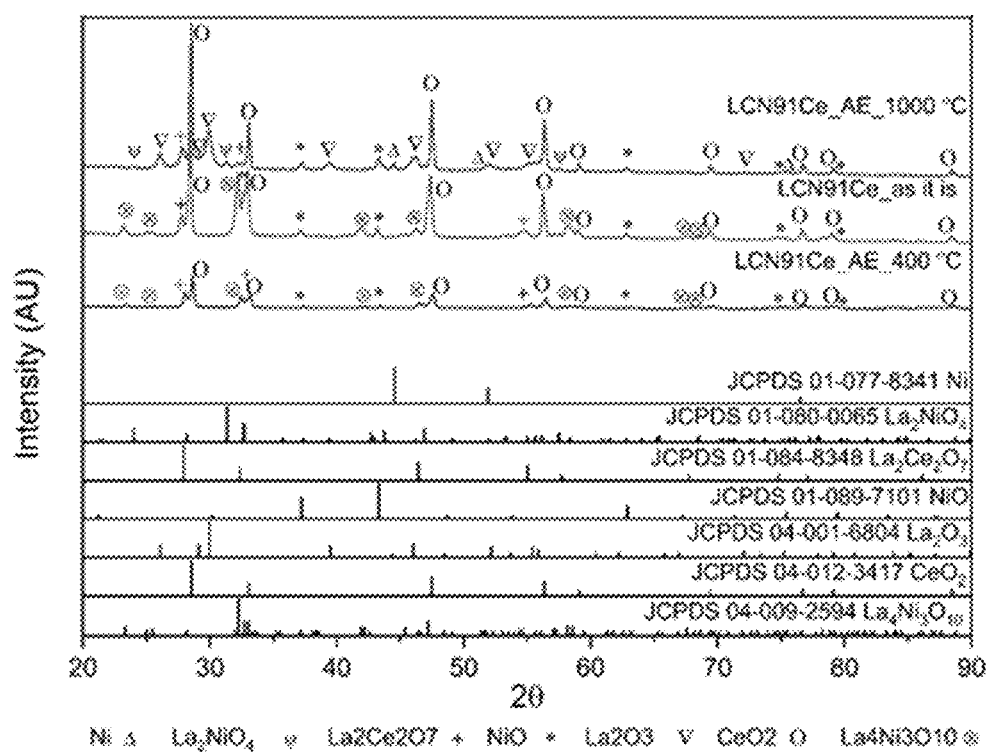
FIG. 4 show XRD patterns of samples as produced and after chemical looping reforming experiments (AE) at 400° C. and 1000° C.
Figure 5:
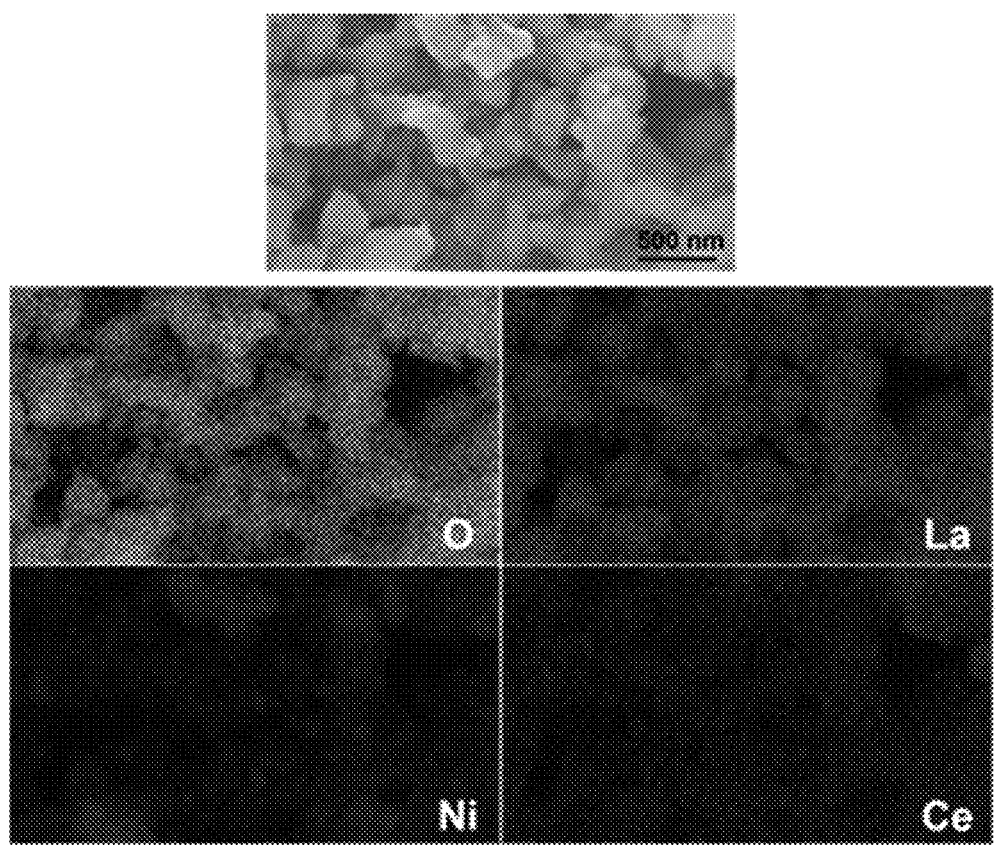
FIG. 5 show SEM images and EDS elemental mapping analysis of LCN91Ce after chemical looping experiment at 1000° C.

The XRD patterns of the fresh CL materials, after CLR cycling at 1000° C. and after CLR cycling at 400° C. are shown in FIG. 4. FIG. 4 shows slight changes in the XRD patterns for the CL materials, due to phase separation of Ni from the $La_{0.9}Ce_{0.1}NiO_3$ perovskite. There are signs of formation of oxides such as $La_4Ni_3O_{10}$ in fresh CL material. After experiments at 1000° C., some material changes to $La_2O_3$ and $La_2NiO_4$. The XRD patterns after 400° C. cycling showed very less differences in comparison to the fresh CL material. The EDS 2D mapping of the materials (FIG. 5) also revealed slight separation of Ni as NiO. This may be the reason for the different PC behavior of the material during temperature ramp up and ramp down, as will be explained soon. The change in material structure is expected to be lower for low temperature operation (150-500° C.).

Figure 6:
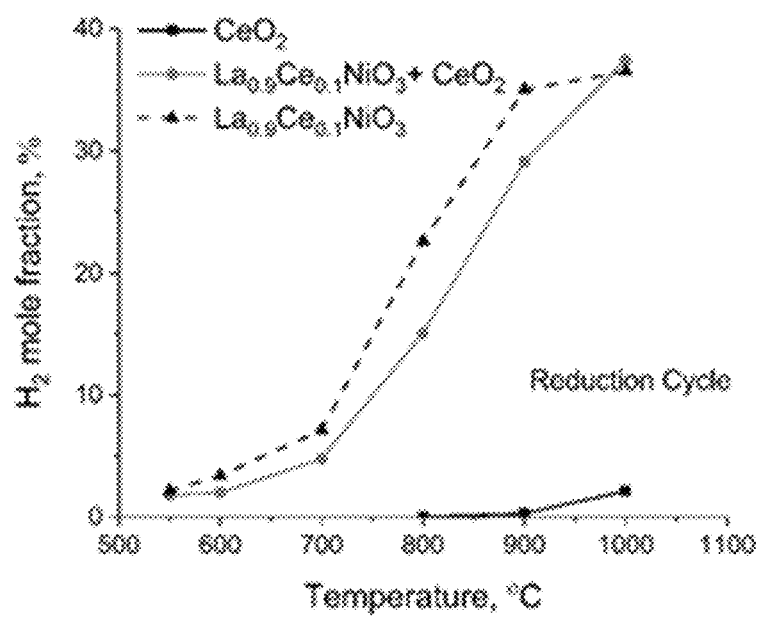
FIG. 6 is a graph showing the percent (%) hydrogen produced in the flow during reduction cycle $CH_4$—$CO_2$ reforming.

Reforming tests of the CL material: To begin with, the effectiveness of the CL material ($La_{0.9}Ce_{0.1}NiO_3$ perovskite+$CeO_2$) for simultaneous $CH_4$ reforming with oxygen carrying capacity, by flowing $CH_4$ (100 sccm)+$CO_2$ (250 sccm) mixture over three different materials of same total mass (200 mg) without plasma: (1) 100% $CeO_2$; (2) 100% $La_{0.9}Ce_{0.1}NiO_3$; and (3) 50:50 mass ratio $La_{0.9}Ce_{0.1}NiO_3$ perovskite+$CeO_2$. The exhaust gases were analyzed using QMS. FIG. 6 shows the percentage $H_2$ in the flow formed due to $CH_4$ reforming for three cases for 550-1000° C. For these reforming measurements, the gases ($CH_4$+$CO_2$) were flown for a longer time (~10 min) for the reforming to reach a steady state when all the oxygen from OC was consumed, and the CL material was reduced to a maximum extent at the reactor flow conditions. The lattice oxygen ions do not get consumed after reaching a steady state, but may play a role in the heterogeneous chemistry. The purpose was only to test the dry reforming performance of perovskite/$CeO_2$ blend. The final steady state species percentage of $H_2$ in the exhaust flow is shown in FIG. 6 in the temperature range of 550-1000° C. The figures also show the percentage CO and $CH_4$ in the exhaust flow, during $CH_4$ reforming in the temperature range of 550-1000° C.

It is found that the reforming capacity of case 3 (perovskite+$CeO_2$) is not much different from case 2 (100% perovskite), is not much different from case 2 (100% perovskite) while there is negligible reforming for case 1 (pure CeO2). This shows catalytic reforming synergy between the perovskite and CeO2 possibly due to the shared high oxygen ion mobility characteristics and synergistic interface transfer chemistry, while achieving the higher oxygen carrying capacity with CeO2 content in the mixture required for CL. $CeO_2$ can release lattice oxygen under oxygen lean conditions and store oxygen under oxygen rich conditions, mainly accommodated by a reversible valence change of cerium ions ($Ce^{4+}+e^- \leftarrow Ce^{3+}$ or $O^{2-}+2Ce^{4+} \leftarrow 2Ce^{3+}+1/2O_2(g)$) with formation or elimination of oxygen vacancies. There is very small reforming level above 900° C. with pure $CeO_2$. Therefore case-3 CL material was used for all CL experiments (reforming reduction cycle with water splitting oxidation cycle) in the following sections.

Figure 7:
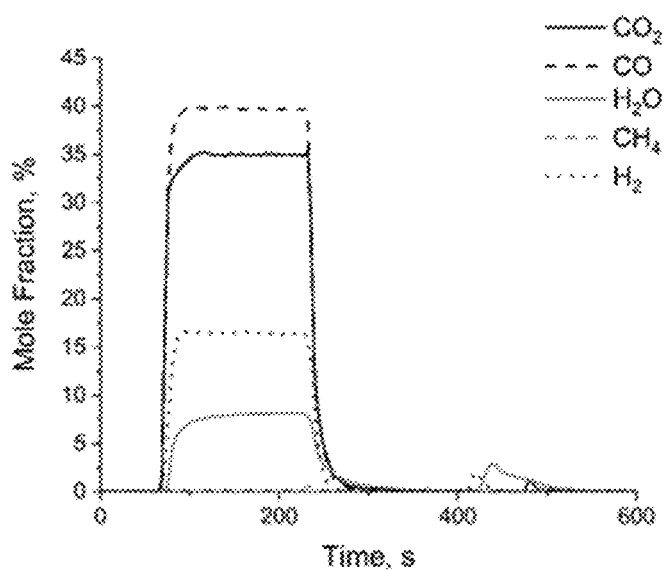
FIG. 7 is a graph showing the measured time resolved species mole fraction after flow over the catalyst during a reduction/oxidation (redox) cycle, at 1000° C., 1 atm pressure.

CLR experiments-Reduction cycle: FIG. 7 shows a typical redox cycle experimental data obtained at 1000° C., measured using the Extrel QMS. Gases such as $CO_2$, $CH_4$, CO, $H_2$ and $H_2O$ were detected during the reduction cycle. Gases such as $H_2$ and $CO_2$ were found during the oxidation cycle. A small spike of $CO_2$ was observed during the oxidation cycle the concentration of which increased with temperature. This spike may be the result of carbon deposition during the reduction cycle. The measured temporal species profile can be time integrated to obtain the total species flowing in a cycle. For example, the $H_2$ profile can be integrated (shaded area in FIG. 7) to obtain the total moles of Hz produced during the reduction cycle by $CH_4$ reforming. These integrated values were used for various types of analysis presented herein.

Figure 13A:
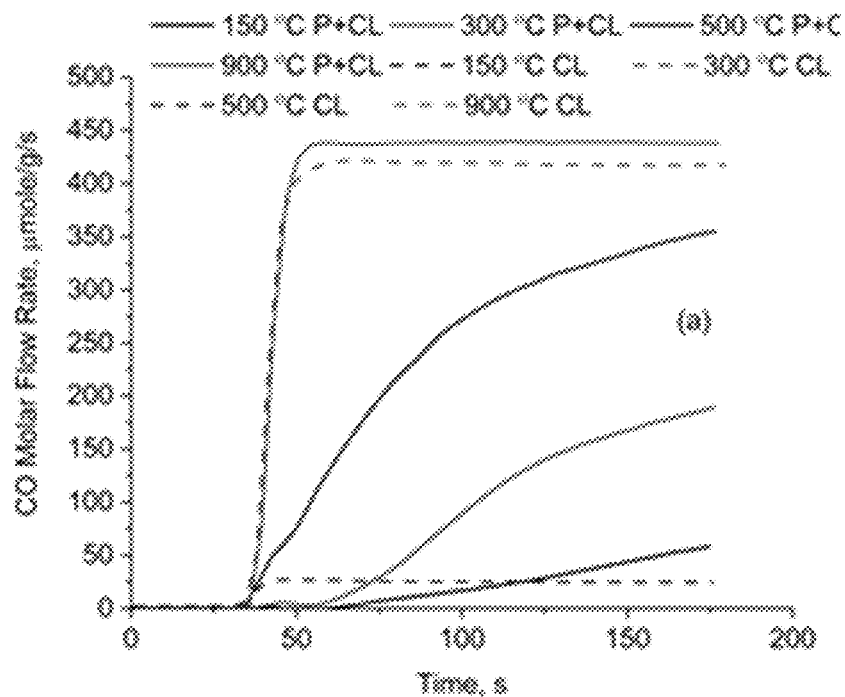
FIGS. 13A-13B are graphs showing the molar flow rate of carbon monoxide (FIG. 13A) and hydrogen (FIG. 13B). P represents plasma and CL represents chemical looping material, during the reduction cycle.
Figure 13B:
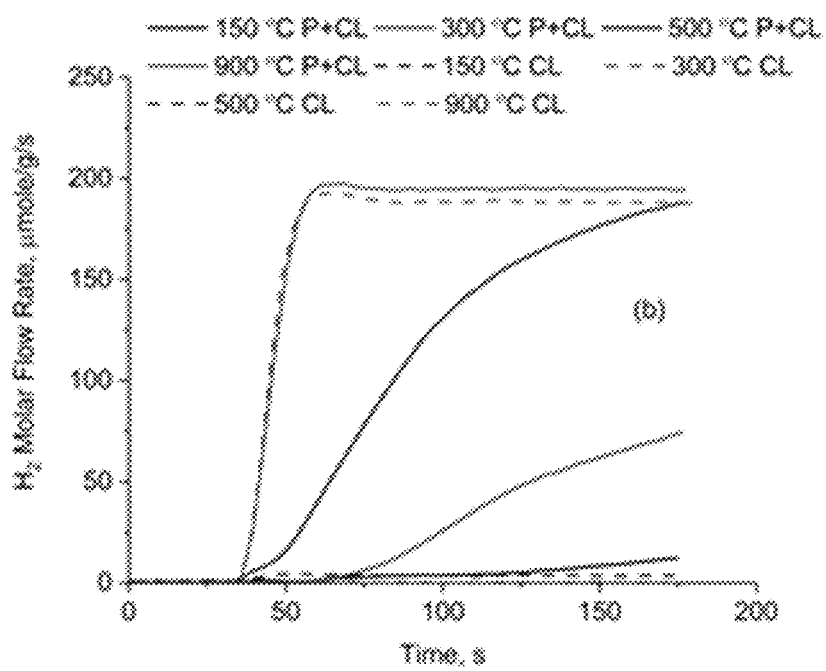
Figure 14A:
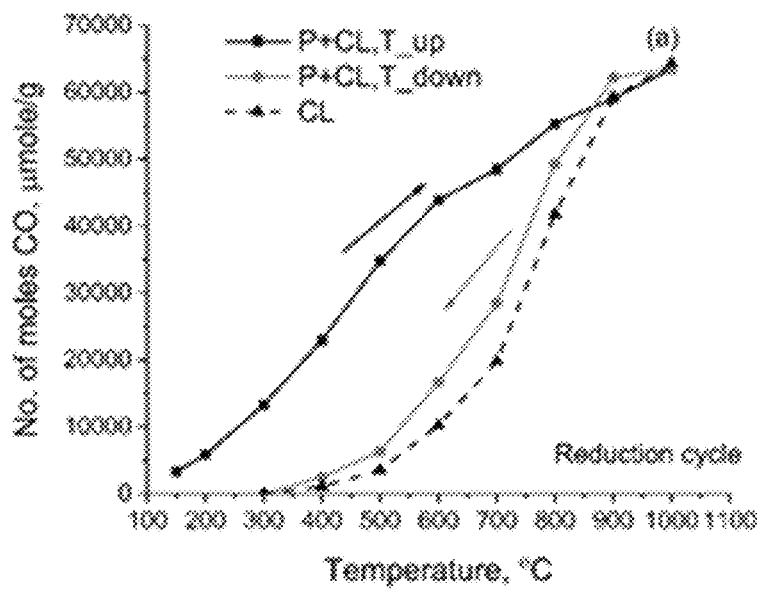
FIGS. 14A-14B are graphs showing the integrated number of moles of carbon monoxide (FIG. 14A) and hydrogen (FIG. 14B) formed during the reduction cycle at various temperatures. P represents plasma; T_up represents temperature ramp up; and T_down represents temperature ramp down.
Figure 14B:
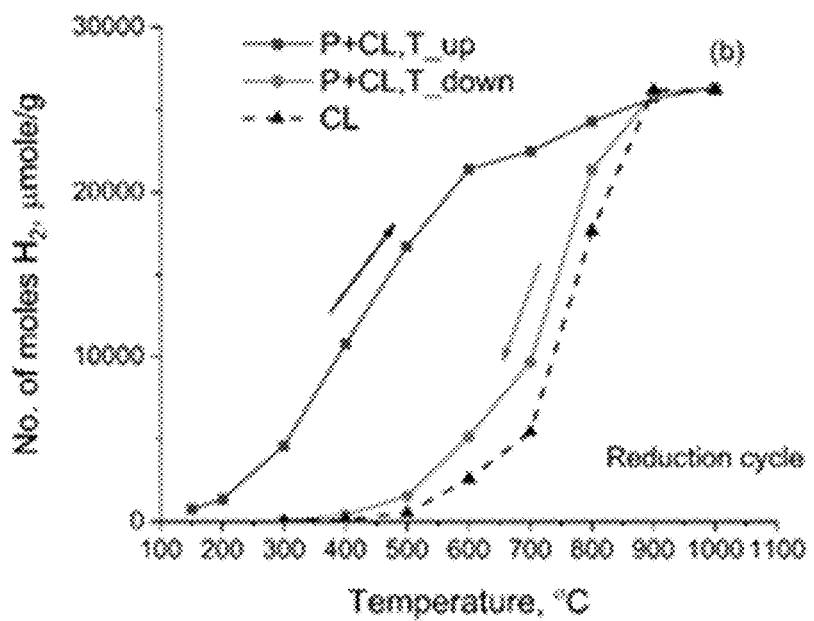
Figure 15A:
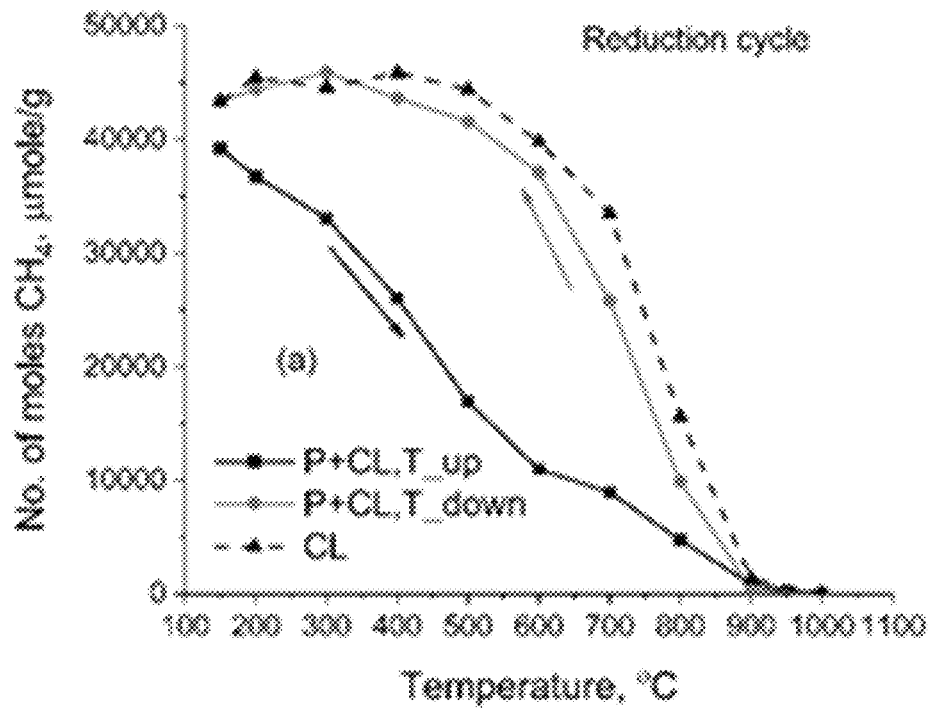
FIGS. 15A-15B are graphs showing the number of moles of methane (FIG. 15A) and carbon dioxide (FIG. 15B) consumed during the reduction cycle.
Figure 15B:
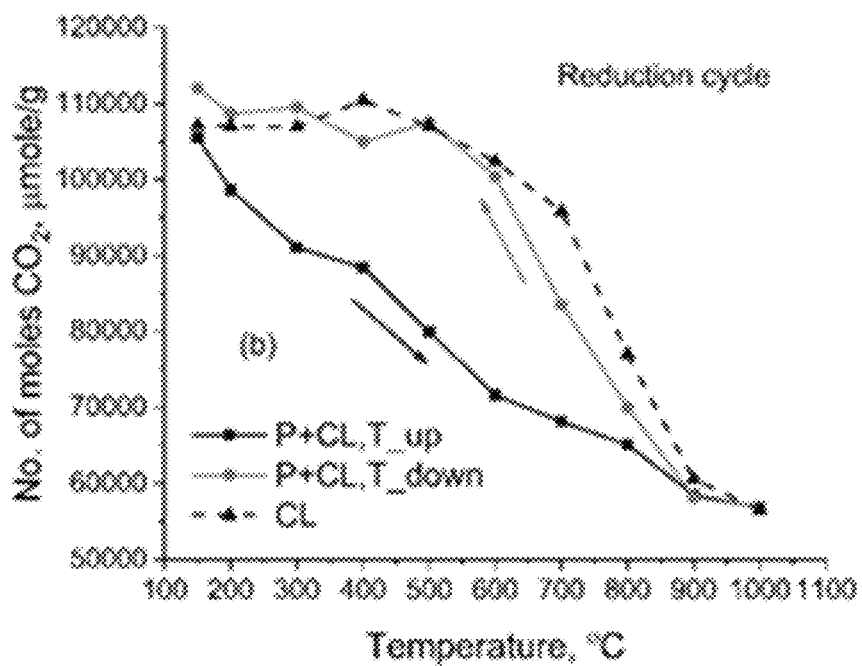
Figure 16A:
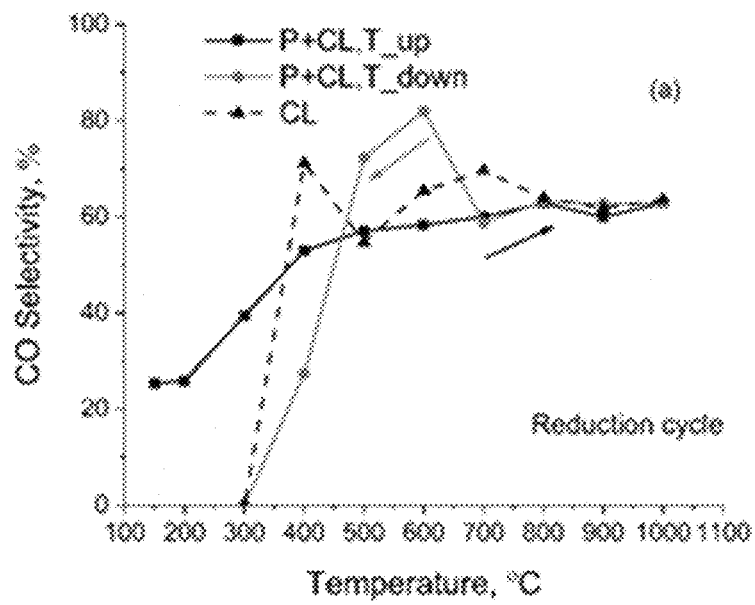
FIGS. 16A-16B are graphs showing the selectivity of carbon monoxide (FIG. 16A) and hydrogen (FIG. 16B) as a function of temperature.
Figure 16B:
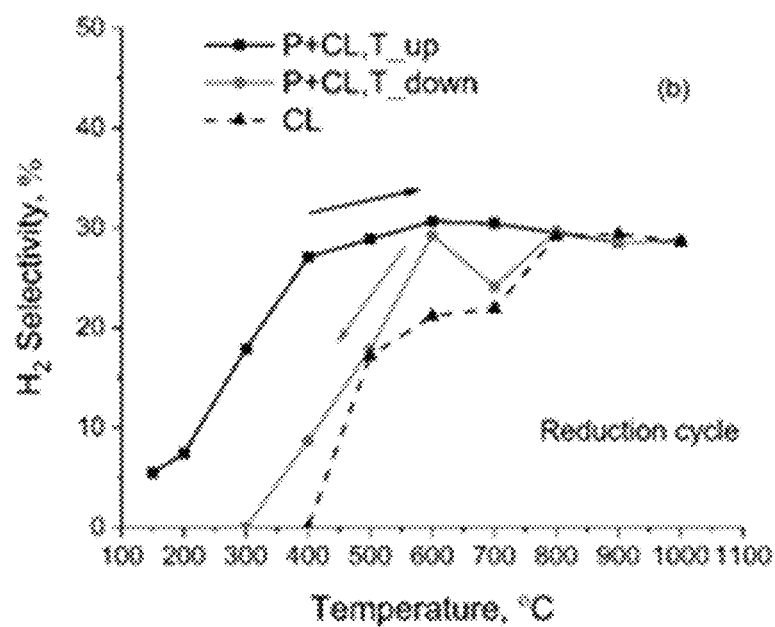

Three different experiments with CL material were conducted (a) CL material is tested without plasma at different temperatures; (b) CL material is tested with plasma at different temperatures with furnace temperature increased stepwise from 150 to 1000° C.; (c) CL material is tested with plasma at different temperatures with furnace temperature reduced stepwise from 1000 to 150° C. The temporal molar flow rate of CO and $H_2$ at different temperatures with plasma and CL material and with CL material only is compared in FIGS. 13A-13B. The integrated number of moles of various species such as CO, $H_2$, $CH_4$, and $CO_2$ evolved during the reduction cycle at different temperatures are plotted in FIGS. 14A-14B. FIGS. 8A-8D show the integrated conversion of $CH_4$, $CO_2$ and integrated yield of CO, $H_2$ by reforming for various temperatures. FIGS. 15A-15B show the integrated moles of $CH_4$, $CO_2$ consumed during reduction cycle vs. temperature. FIGS. 16A-16B show the selectivity towards CO, $H_2$ formation vs. temperature by reforming. With the increase in temperature, the conversion increases resulting in less $CH_4$ and $CO_2$ measured in the exhaust.

The thermodynamic equilibrium calculation for the reactant mixture of $CH_4$=28.5% and $CO_2$=71.5% was done using CANTERA MATLAB Equilibrium code and GRI mechanism for the temperature range 100-1000° C. The equilibrium concentrations of species such as $CH_4$, $CO_2$, CO, $H_2O$ and $H_2$ were plotted vs. temperature. Below ~400° C., there is no formation of CO, $H_2$, and $H_2O$. Therefore, plasma enhances the low temperature reaction in this case. Experiments with (FIGS. 8A-8B) 'only plasma' and 'no CL material and no plasma' showed insignificant reforming for temperatures below 900° C., so results for these cases are not included in the figures. At low temperatures, a significant improvement in yields are observed with plasma and CL material when compared with CL material only.

Much higher yields of $CH_4$ reforming were observed in the temperature range at all temperatures while increasing the temperatures step wise for each temperature case. No reforming was observed in the temperature range 150-400° C. for the two cases (1) without plasma (2) with plasma and during decreasing temperature after heating the CL material to 1000° C. However, there is a significantly higher yield (62% enhancement at 600° C.) during decreasing temperature for PC case compared to just the CL material. For the CL material only, no reforming was observed for temperatures below 500° C. All three cases (FIGS. 8A-8D) showed a $CH_4$ conversion of ~100% at 1000° C. and a $CO_2$ conversion of ~50% at 1000° C. During the temperature increase, at 600° C., the $H_2$ yield is ~7.5 times more, CO yield is 4.6 times more than without plasma. There is a steady increase in yields up to ~600° C., after which the increase rate is less steep. $CH_4$ and $CO_2$ conversion values of 14.7% and 5.78% respectively at 150° C. with PC for temperature increasing case. The decrease in yield with PC after cycling the CL material at 1000° C. can be assigned to the change in material structure, as was discussed herein. These results show significant advantages in reactor construction and efficiency. For example, to achieve the same $H_2$ yields as at 500° C. with PC, the reactor needs to be heated to 800° C. for the case without plasma. Almost no change in CL material structure is expected below ~500° C., leading to a more durable reactor.

In steady state reforming experiments, Yabe et al. used Ni/La—$ZrO_2$, at 150° C. reactor temperature. With 3.7 W of applied power, a 22.8% conversion of $CH_4$ and 24.8% conversion of $CO_2$ at an input flow rate of 100 sccm were obtained. These values are comparable to $CH_4$ conversion values of ~15% at 150° C. in this example. PC Chemical looping combustion was performed by Zheng et al., using a NiO/$Fe_2O_3$ catalyst at 400° C. During the reduction cycle, a combination of $CH_4$ and Ar was used flowed. Air was used for the oxidation cycle. A $CH_4$ conversion of 39% was achieved at 400° C. These values are comparable to $CH_4$ reforming conversion of ~43% in this example.

Figure 9:
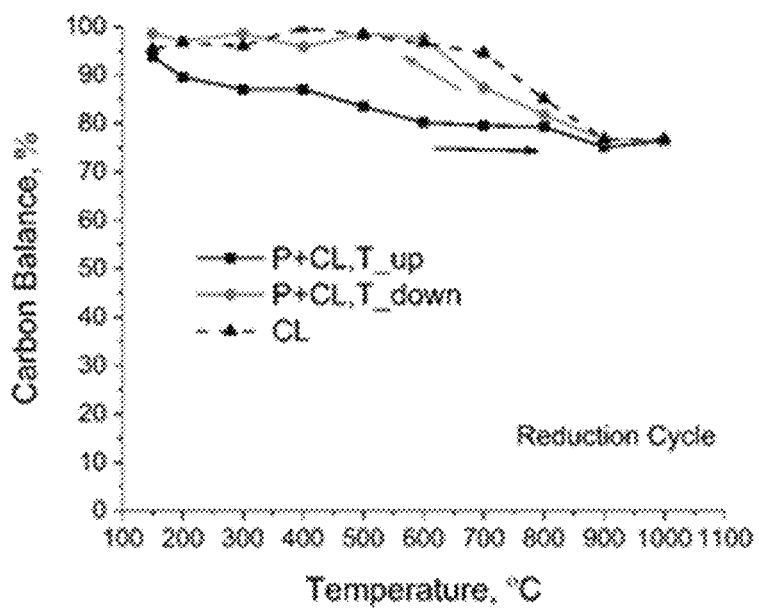
FIG. 9 shown an estimated carbon balance for the experiments at different temperatures.

Carbon inflow into the reactor is in the form of $CH_4$ and $CO_2$, while carbon outflow is in the form of $CH_4$, CO, $CO_2$. The difference between time integrated carbon inflow and carbon outflow for one complete cycle (Eqn. 7) is shown in FIG. 9 for different temperatures. For experiments without plasma the carbon deficit is <7% for temperatures <700° C., which then increases to ~20% at 1000° C. For the PC case (increasing temperature experiments case), the carbon deficit gradually increased from 5% at 150° C. to ~24% at 1000° C. It is possibly because carbon was produced in other forms of $C_2$ hydrocarbon species such as $C_2H_4$, $C_2H_6$ and $C_2H_2$ which were not measured in the current experiments. These species can be formed in the plasma by the combination of plasma dissociated radicals from $CH_4$, such as $CH_3$, $CH_2$, and CH on the catalyst surface or in the gas phase plasma. These undetected hydrocarbons may have contributed to the carbon balance deficit. These species can be measured and quantified. Oxidative Coupling of Methane (OCM) to form C2 hydrocarbons may have occurred in the initial stages of reduction cycle when the OC is being reduced.

Figure 10A:
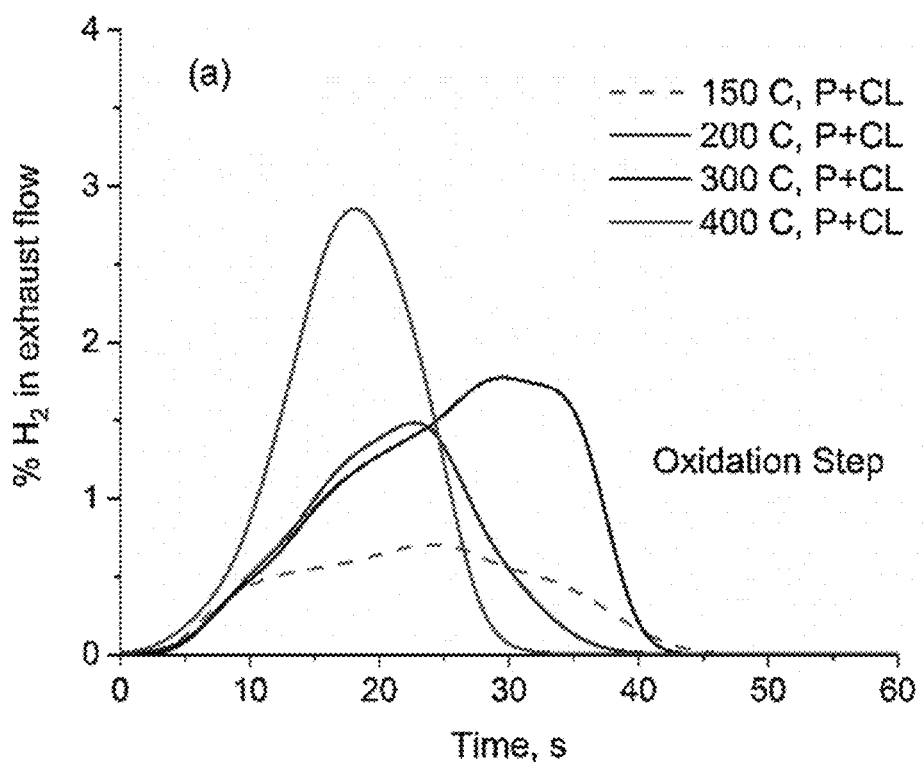
FIGS. 10A-10B are graphs showing the measured percentage $H_2$ flow in the exhaust in temperature range 150-400° C.
Figure 10B:
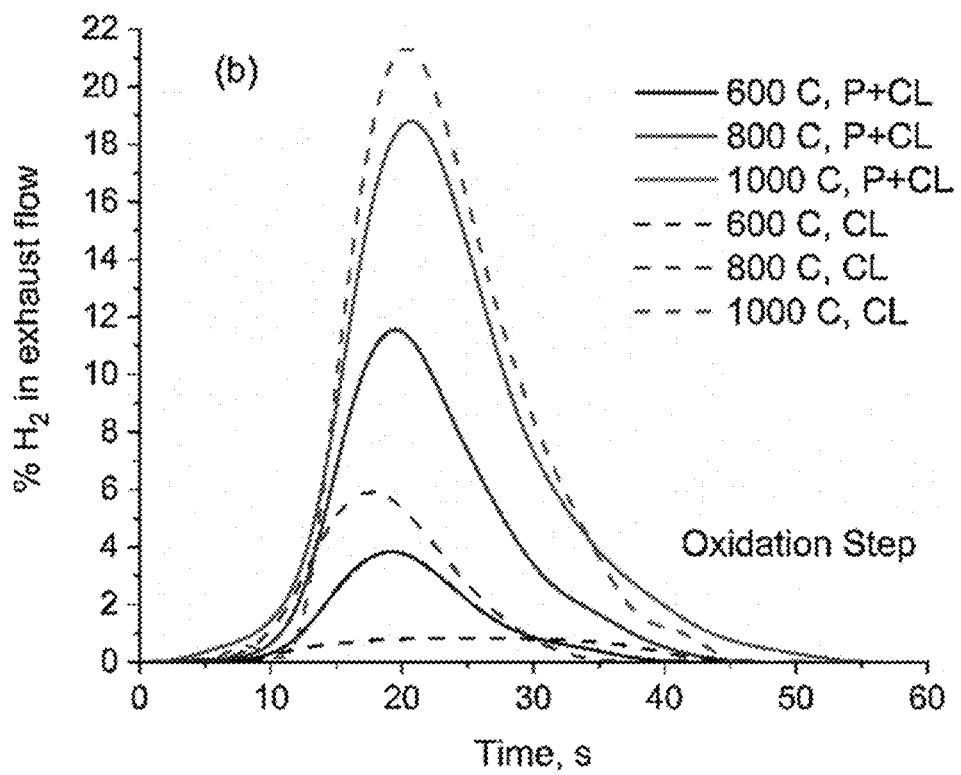
Figure 11:
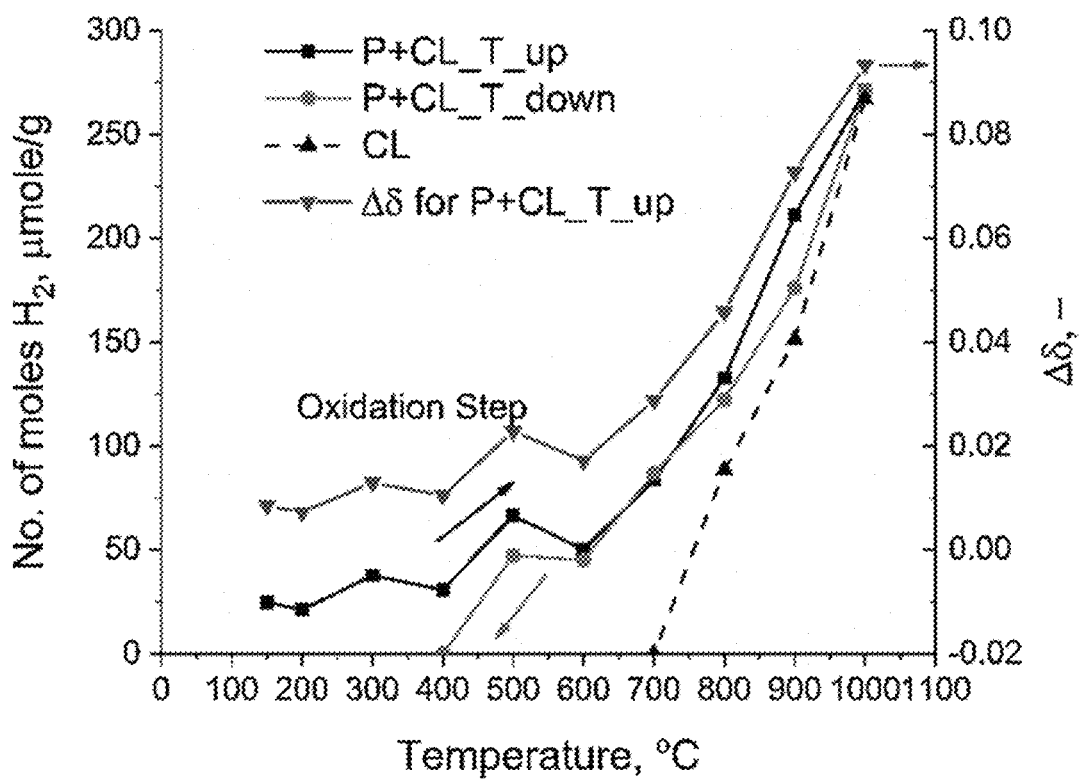
FIG. 11 is a graph showing the integrated hydrogen production as a function of temperature, with and without plasma. The change in performance during increase and decrease in temperature is also shown.

CLR experiments-Oxidation cycle: FIGS. 10A-10B show the temporal percentage $H_2$ flow measured using the QMS at the reactor exhaust, due to water splitting during the oxidation cycle for different temperatures. FIG. 11 shows the integrated $H_2$ produced by $H_2O$ splitting at different temperatures for three different cases. No water splitting was observed below ~700° C. for CL material only. For the case of increase temperature case with PC, $H_2O$ splitting at low temperatures (150-600° C.) was observed. PC performance of the CL material deteriorated after cycling the temperature at 1000° C., with $H_2O$ splitting observed only above 500° C. Again this is attributed to CL material structural changes as discussed herein. The amount of Hz production is limited by the oxygen carrying capacity of the OC and the extent of its reduction. More OC mass and higher level of reduction during the reduction step will give more Hz.

The higher amount of Hz by water splitting with PC at all temperatures, is the outcome of greater extent of material reduction due to reactive plasma radicals produced during the reduction step such as the CHx, H, CO by electron impact on $CH_4$ and $CO_2$. The oxidation of the CL material can be more complete with $H_2O$ vapor in plasma due to abundant O atoms produced by electron impact dissociation of $H_2O$. Without the plasma, for $H_2O$/Ar flows, the fugacity of $O_2$ is less than with $O_2$/Ar flows. Therefore, the oxidation is less complete for $H_2O$/Ar flows without the plasma. For example, it has been previously found that water did not completely oxidize $CeO_2$ (without plasma) and another air flow step was required to completely oxidize $CeO_2$ at all temperatures. Time integrated number moles of CO+$CO_2$ flowed during oxidation step per integrated number of moles of $CH_4$+$CO_2$ flowed during reduction step was plotted. The numbers are within the range of 0.0002-0.0018. This means that there is less than 0.18% carbon deposition from the flow. There is a slight increase in carbon deposition with plasma catalysis.

The thermodynamic equilibrium calculations for the reactant mixture of $H_2O$=10% and Ar=90% was performed using CANTERA MATLAB Equilibrium code from 1200 to 3000° C. The equilibrium concentration of $H_2$ is plotted against temperature. Below 1500° C., there is no formation of $H_2$. Previous studies performed equilibrium calculations for pure $H_2O$ and showed formation of $H_2$ only above temperatures of 2000° C. Therefore, it was shown that plasma catalysis is useful in enhancing $H_2$ production at very low temperatures.

In FIG. 11 the calculated change in delta in $CeO_2$-δ is shown for the oxidation step at different temperatures for the PC case with increasing temperature. This is calculated by dividing the total number of moles of hydrogen formed during the oxidation step by the total number of moles of ceria used in the experiment. The range of change in delta is 0.008-0.09. At 700° C., the change in delta for the material ceria is 0.028. The relatively low values are possibly because of lesser extent of reduction due to the higher fugacity of $O_2$ in the $CH_4$/$CO_2$ flow compared to $H_2$/Ar flow.

Efficiency: Energy conversion efficiency(ECE) is a good indicator for understanding the efficiency of plasma reforming process. The ECE was calculated as the ratio of Lower Heating Value (LHV) of syngas produced in the reforming divided by the input power as in Eq. (10). It is desirable to have higher ECE.

$$ECE(\eta) = \frac{(\dot{n}_{CO} LHV_{CO} \overline{M}_{CO} + \dot{n}_{H_2} LHV_{H_2} \overline{M}_{H_2})}{(\dot{n}_{CH_4,in} C_{CH_4} LHV_{CH_4} \overline{M}_{CH_4} + P_{plasma} + P_{reac})} \quad \text{Eq. 10}$$

Figure 8A:
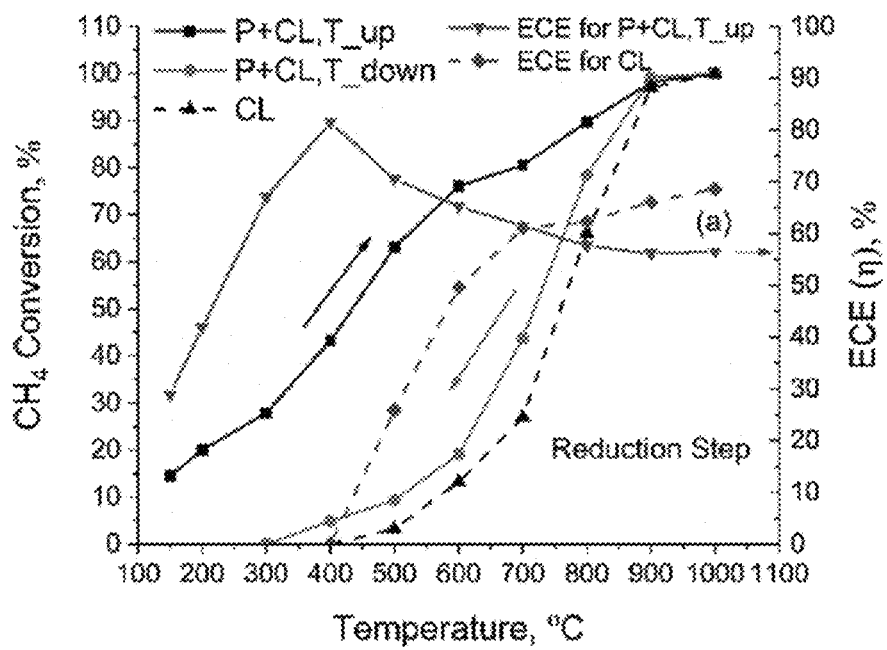
FIGS. 8A-8D are graphs showing conversion of $CH_4$ (FIG. 8A) and $CO_2$ (FIG. 8B) as well as yield of CO (FIG. 8C) and $H_2$ (FIG. 8D) at various temperatures.
Figure 8B:
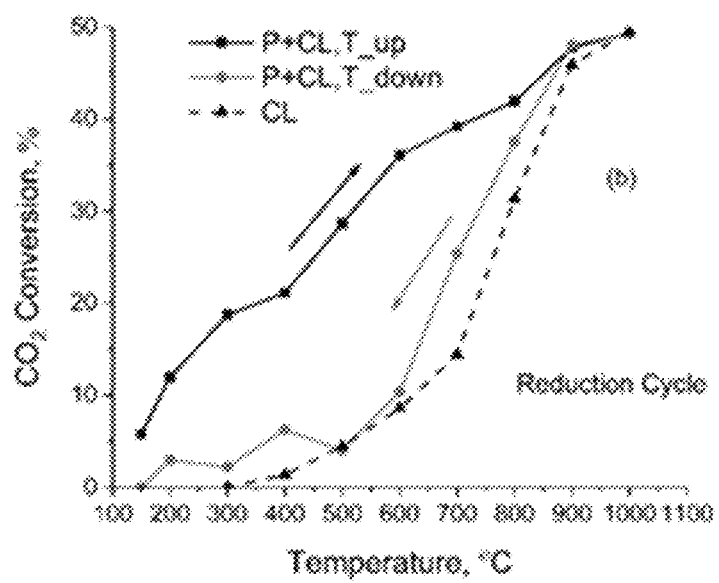
Figure 8C:
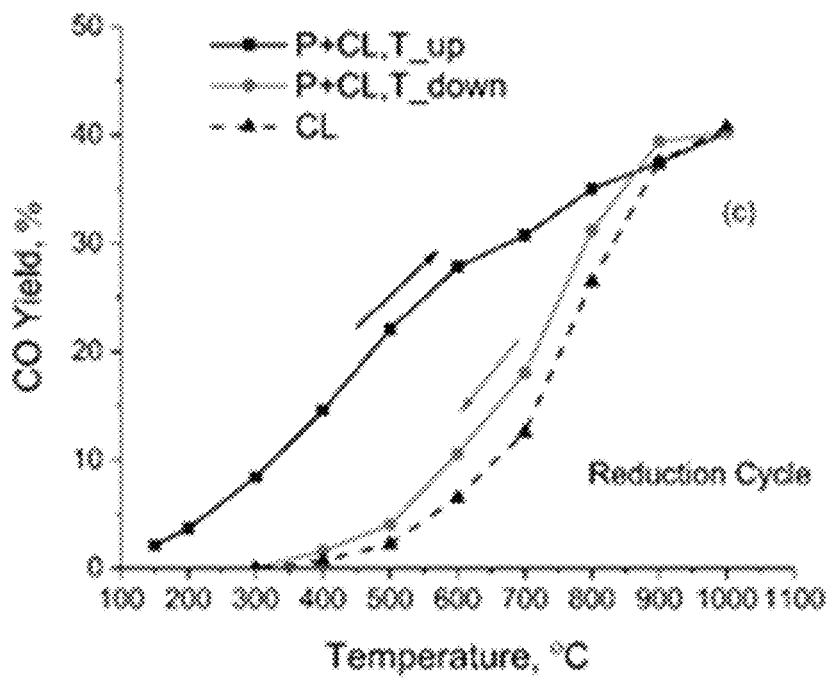
Figure 8D:
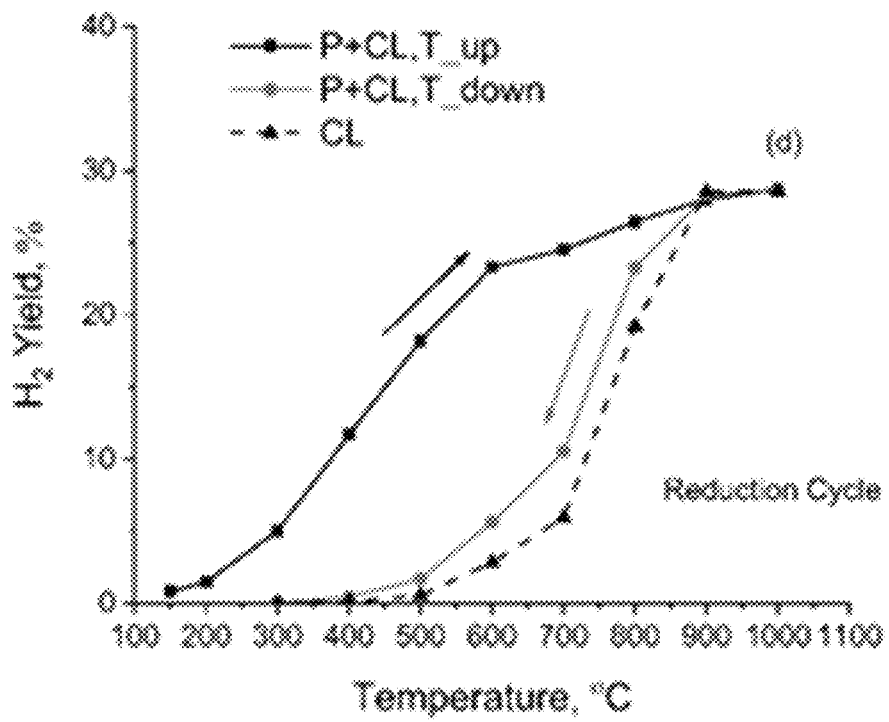

$n_{CO}$ and $n_{H2}$ are the molar outflow rates of CO and $H_2$, respectively, $M_{CO}$, $M_{CH4}$ and $M_{H2}$ are the molar masses of CO, $CH_4$ and $H_2$, respectively, $n_{CH4}$ is the molar inflow rate of $CH_4$, $C_{CH4}$ is the measured steady state $CH_4$ conversion fraction. LHVX is the LHV of species X, $P_{plasma}$=6W, is the measured plasma input power, $P_{reac}$ is the power required to heat the gas to the reactor inlet temperature. ECE calculated for the PC case (b) with increasing temperature is shown in FIG. 8A. With the increase in temperature, the ECE reaches an optimum high of 81.5% at 400° C. Similarly, the ECE was calculated for the case (a) with only CL material and no plasma power and shown in FIG. 8A. The ECE is in the range of 0-68.2% from 500 to 1000° C., with cross over between the two cases at ~700° C. While case (b) shows higher overall ECE (81.5% at 400° C.), case (a) leads to complete $CH_4$ conversion for temperatures >900° C. without plasma with ~68.2% ECE.

Summary: Plasma-catalysis Ni-based perovskite mixed with ceria powder was experimented for chemical looping reforming step coupled with water splitting step in the temperature range 150° C. to 1000° C. Experiments were conducted with and without plasma, during temperature ramp up and ramp down. Without plasma, the redox reactions were observed for temperatures>700° C. However, with PC synergy substantial reactions and yield was observed in 150-400° C. temperature range. Enhancements in yield and reactivity were also observed above 400° C. for the temperature ramp up PC experiments (case (b)). The study showed significant $CH_4$ and $CO_2$ conversion at 150° C. and enhancements at higher temperatures during temperature ramp up (case (b)). $H_2$ production by water splitting was observed with PC in 150-400° C. temperature range during temperature ramp up (case(b)). The conversion and yield decreased during the temperature ramp down from 1000° C. (case (c)). This is due to slight change in material structure at high temperature as verified by SEM and XRD images. Observed PC synergy implies efficiency improvement and many reactor construction advantages from lab scale to real time applications. For example, for the same amount of $H_2$ production through PC water splitting at 300° C. would require about 750° C. without plasma. The required power to run the plasma in this temperature range is only 2-6 W. More efficient surface plasma discharges could be developed for real applications. The breakdown voltages of plasma are higher at higher pressures as defined by the Paschen curve. The breakdown is a function of both temperature and pressure, through the non-dimensional variable E/N, where E is electric field and N is concentration of neutral. By applying highpressure (in the range of 0.5-15 MPa) plasma hydrocarbon synthesis from syngas is reported in the literature. Similar enhancement was expected at higher pressures. The required E/N values can be achieved by modifying the surface plasma, plasma frequency, and peak voltages. Thus, PC can enhance reactions at lower temperatures efficiently, while maintaining the integrity of materials over long hours. Better advantages of PC at lower temperatures, reaching an optimum value at ~400° C.

Many industries (power plants, oil companies etc.) have waste heat or renewable energy available in the temperature range 150-400° C. The exhaust from power plants containing $CO_2$ can be used along with $CH_4$ to produce $H_2$ as demonstrated in this study. Although the conversion of $CO_2$ (14-43%) is not close to 100%, the authors think this is a considerable step towards usage of the $CO_2$. Examples of practical usage of such amounts of $CO_2$ conversion (14-43%) can be in stabilization of gas turbine combustion and development of solar-hybrid power plants. The smaller amounts of syngas produced in our study at low temperatures can stabilize combustion, reduce NOx emissions, improve efficiency and reduce acoustic noise in industrial burners and gas turbines while using lean mixtures of $CH_4$ mixed with syngas. Solar reactors can use feedstock $CH_4$+$CO_2$ to generate chemicals such as $H_2$ which could be used for fuel cells. More advanced nano-materials for higher conversion of $CH_4$+$CO_2$ to syngas will be the subject of future studies.

Plasma-catalysis Ni-based perovskite mixed with ceria powder was experimented for chemical looping reforming and water splitting in the temperature range 150° C. to 1000° C. Experiments were conducted with and without plasma, during ramp up and ramp down of temperature. Without plasma, the redox reactions were observed for temperatures >700° C. However, with PC synergy significant reactions and yield were observed in 150-400° C. temperature range. Enhancements in yield and reactivity were also observed above 400° C. for the temperature ramp up PC experiments. This example showed significant $CH_4$ and $CO_2$ conversion at 150° C. and enhancements at higher temperatures during temperature ramp up. $H_2$ production by water splitting was observed with PC in 150-400° C. temperature range during temperature ramp up. The conversion and yield decreased during the temperature ramp down from 1000° C. This is due to slight change in material structure at high temperature as verified by SEM and XRD images. PC synergy shows significant efficiency and reactor construction advantages from lab scale to real time applications. For example, for the same amount of $H_2$ production through PC water splitting at 300° C. would require ~750° C. without plasma. The required power to run the plasma in this temperature range is only 2-6 W. However, more efficient low power (less than 1 W per 200 mg combined catalyst and oxygen carrier) surface plasma can be generated using semiconductor fabrication methods. PC can enhance reactions at lower temperatures efficiently, while maintaining the integrity of materials over long hours.

The materials and methods of the appended claims are not limited in scope by the specific materials and methods described herein, which are intended as illustrations of a few aspects of the claims and any materials and methods that are functionally equivalent are within the scope of this disclosure. Various modifications of the materials and methods in addition to those shown and described herein are intended to fall within the scope of the appended claims. Further, while only certain representative materials, methods, and aspects of these materials and methods are specifically described, other materials and methods and combinations of various features of the materials and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A chemical looping reform method comprising:
heating an oxygen carrier in the presence of a catalyst and plasma radicals to react the oxygen carrier with a fuel to provide a reduced oxygen carrier;
wherein the catalyst is a perovskite catalyst having the formula $La_{1-x}Ce_xNiO_3$, further wherein x is a number defined by 0.02<x<0.98; and
contacting the reduced oxygen carrier with water or carbon dioxide to produce hydrogen or carbon monoxide, respectively, and regenerate the oxygen carrier;
wherein the method has an operating temperature of from 150° C. to 300° C.

2. The method of claim 1, wherein the chemical looping reform method is carried out at a temperature from 150° C. to 250° C.

3. The method of claim 1, wherein the chemical looping reform method is carried out at a temperature from 150° C. to 200° C.

4. The method of claim 1, wherein the oxygen carrier is a metal oxide oxygen carrier comprising a metal selected from the group consisting of cerium, nickel, copper, iron, cobalt, manganese, aluminum, titanium, zirconium, silicon, lanthanum, magnesium, and a mixture thereof.

5. The method of claim 4, wherein the metal oxide oxygen carrier comprises cerium oxide.

6. The method of claim 4, wherein the metal oxide oxygen carrier and the perovskite catalyst are sintered prior to reacting the oxygen carrier and the fuel.

7. The method of claim 6, wherein the metal oxide oxygen carrier and the perovskite catalyst are present in a weight ratio of from 1:5 to 5:1.

8. The method of claim 6, wherein after sintering, the metal oxide oxygen carrier and the perovskite catalyst has a BET surface area of 10 $m^2$/g or greater.

9. The method of claim 1, wherein the fuel comprises a syngas or a hydrocarbon selected from an alkane, an alkene, a cycloalkane, a cycloalkene, an aryl group, or a combination thereof.

10. The method of claim 1, wherein the water is provided in the presence of a gas selected from argon, nitrogen, or a combination thereof.

11. The method of claim 1, wherein the fuel comprises a syngas and a hydrocarbon selected from an alkane, an alkene, a cycloalkane, a cycloalkene, an aryl group, or a combination thereof.

* * * * *